United States Patent [19]

Nishiyama et al.

[11] Patent Number: 5,416,721
[45] Date of Patent: May 16, 1995

[54] METHOD OF AND SYSTEM FOR AUTOMATICALLY GENERATING NETWORK DIAGRAMS

[75] Inventors: Tamotsu Nishiyama, Hirakata; Kazushi Ikeda, Tsu; Tomoko Matsunaga, Kumamoto, all of Japan

[73] Assignee: Matsushita Electric Industrial Co., Ltd., Osaka, Japan

[21] Appl. No.: 819,227

[22] Filed: Jan. 13, 1992

[30] Foreign Application Priority Data

Jan. 18, 1991 [JP] Japan ................................ 3-004367

[51] Int. Cl.6 .............................................. G06F 15/60
[52] U.S. Cl. ..................................... 364/491; 364/488
[58] Field of Search ................. 364/488, 489, 490, 491

[56] References Cited

U.S. PATENT DOCUMENTS

| | | | |
|---|---|---|---|
| 4,918,614 | 4/1990 | Modarres et al. | 364/490 |
| 5,050,091 | 9/1991 | Rubin | 364/488 |
| 5,111,413 | 5/1992 | Lazansky et al. | 364/578 |
| 5,168,563 | 12/1992 | Shenoy et al. | 395/500 |

FOREIGN PATENT DOCUMENTS

| | | |
|---|---|---|
| 0363017 | 4/1990 | European Pat. Off. |
| 60-176177 | 9/1985 | Japan |
| 60-205672 | 10/1985 | Japan |
| 61-204775 | 9/1986 | Japan |
| 275072 | 3/1990 | Japan |

OTHER PUBLICATIONS

Robert Sedgewick; "Algorithms in C"; pp. 480–499; ©1990.
I. Shoten, "Iwanami Course of Lectures–Information Engineering 10: Fundamental Algorithm", pp. 52–61, 1983.
"Exercise of Graph Theory: Foundation and Application", Corona Publishing Co., Ltd., pp. 158–165, 1983.
Kojima, et al, "A Schematic–Generator for Logic Design," Technical Report GAS 84-134 of The Institutes of Electronics and Communication Engineers of Japan, pp. 47–54, 1984.
30th National convention Record (First Term of 1985) of Information Processing Society of Japan, pp. 1901–1904 and 1973–1974.
Chun, et al, "Vision: VHDL Induced Schematic Imaging on Net-Lists," 24th ACM/IEEE Design Automation Conference, Paper 25.4, pp. 436–442, 1987.
May, et al, "Placement and routing for logic schematics," Computer-aided Design, vol. 15, No. 3, pp. 115–122, May 1983.
Kumar, et al, "Automatic Generation of Digital Systems Schematic Diagrams," IEEE Design & Test of Computers, vol. 3, No. 1, pp. 58–65, Feb. 1986.

*Primary Examiner*—Kevin J. Teska
*Assistant Examiner*—Susan Wieland
*Attorney, Agent, or Firm*—Stevens, Davis, Miller & Mosher

[57] ABSTRACT

In network charts such as logic circuit diagrams, the present invention makes it possible to perform level assignment of nodes efficiently and universally. A method for assigning levels to nodes according to the present invention includes a first step of dividing a network chart or a logic circuit into strongly connected components, a second step of providing all arcs with weights for every node of the above described strongly connected components having at least two nodes so that the inflow of arc weight may become equivalent to the outflow thereof, a third step of detecting an arc for which the weight in the above described strongly connected component becomes the maximum, and a fourth step of determining a disconnection point of a loop out of arcs for which the above described weights become the maximum or becomes its proportionate magnitude. All loops included in the network chart are thus removed.

36 Claims, 13 Drawing Sheets

FIG. 8 inv 00 :::

size :: [(0,-2),(5,2)];
    in (i) :: (0,0);
    out (o) :: (5,0), and 201 :::

size :: [(0,-1),(6,3)];
    in (ia) :: [(0,2),(0,0)];
    out (o) :: (6,1), and 301 :::

size :: [(0,-1),(6,3)];
    in (ia) :: [(0,2),(0,1),(0,0)];
    out (o) :: (6,1),

FIG. 9 dev 1 :::

a kiend of :: invoo:
    input (i) :: k1;
    output (o) :: net 1.

dev 3 :::

a kiend of :: and 301;
    input (ia) :: [k2,k4,net1];
    output (o) :: net3.

dev 5 :::

a kiend of :: and 201;
    input (ia) :: [net3,net4];
    output (o) :: f dev 1 :::

a kiend of :: invoo,
    position :: (12,13);
    angle :: 0;
    mirror :: false.

dev 3 :::

a kiend of :: and 301;
    position :: (25,18);
    angle :: 0;
    mirror :: false.

dev 5 :::

a kiend of :: and 201;
    position :: (39,17);
    angle :: 0;
    mirror :: false.

net 1 :::

a kiend of :: wire;
    io :: [(17,13),(25,18)];
    net :: [[(17,13),(21,13),(21,18),(25,18)]].

net 3 :::

a kiend of :: wire;
    io :: [(31,19),(39,19)];
    net :: [[(31,19),(39,19)]].

METHOD OF AND SYSTEM FOR AUTOMATICALLY GENERATING NETWORK DIAGRAMS

BACKGROUND OF THE INVENTION

1. Field of the Invention

The present invention relates to a system for automatically drawing network charts such as logic diagrams, function diagrams, block diagrams, process drawings, related tree diagrams, and layouts of printed circuit boards, and in particular to a method of and a system for automatically generating network charts whereby logic diagrams, function diagrams, or circuit diagrams are generated on the basis of circuit components such as circuit devices or partial circuits and their connection information.

2. Description of the Related Art

Various methods have heretofore been proposed with regard to automatic logic circuit diagram generation. For example, these methods are disclosed in JP-A-61-204775, Technical Report CAS 84-134 (1984) of The Institute of Electronics and Communication Engineers of Japan, pp. 47-54, JP-A-60-205672, JP-A-60-176177, JP-A-2-075072, and 30th National Convention Record (First Term of 1985) of Information Processing Society of Japan, pp. 1901-1904 and pp. 1973-1974.

In general, automatic logic circuit diagram generation is implemented by determining placement of plotting symbols, such as respective circuit components, by means of automatic placement and thereafter determining wiring between circuit components by means of automatic wiring.

As for the conventional method of placing circuit components on a logic circuit in the automatic logic circuit diagram generation method, positions wherein plotting symbols can be placed are limited to positions of checkers imagined on a drawing, and placement of plotting symbols is successively determined in accordance with wiring relations between plotting symbols, i.e., connection relations between circuit components in a predetermined direction from one end of the drawings to another, such as a direction proceeding from the output side to the input side or a direction proceeding from the input side to the output side. As the procedure for this placement determination, level assignment of plotting symbols, i.e., column assignment (level assignment) for placement is first performed according to the wiring relations with an input terminal, i.e., an input port of each plotting symbol, or an output terminal, i.e., an output port as the starting point. Thereafter, plotting symbols in each column are successively positioned by minimizing intersections of wiring to plotting symbols of a preceding column (level) already positioned or minimizing the total length of all wiring between plotting symbols.

Especially in case a link of consecutive wiring between plotting symbols forms a loop (including a cycle) in the above described level assignment, the loop is disconnected once and then level assignment is performed in general. As this loop disconnection method, (1) a method of defining the position of a predetermined plotting symbol as the disconnection point of that loop, or (2) a method of detecting all loops of a circuit diagram and defining a location where overlap of those loops is maximized as the disconnection point of loops can be used, for example.

However, level assignment of the prior art has the following problems because a loop formed by plotting symbols representing respective circuit components and wiring between those plotting symbols is disconnected.

The above described method (1) wants universality because a loop cannot be disconnected unless a particular plotting symbol such as a flip-flop is included in that loop.

For all loops in the circuit diagram, all paths forming those loops must be detected in the above described method (2). Therefore, the circuit scale becomes large. If the number of loops becomes large, the processing time becomes extensive.

That is to say, a circuit is divided into small portions, and thereafter logic circuit diagrams are automatically generated and loops are disconnected in places of flip-flops. Therefore, the prior art has a problem that universality and processing efficiency are not satisfactorily considered.

SUMMARY OF THE INVENTION

In view of these points, the present invention has been made. An object of the present invention is to provide a method of and a system for automatically generating network charts which eliminate the problems of the prior art in network charts such as logic circuit diagrams and which make possible performing level assignment of nodes efficiently and universally.

In order to achieve the above described object, a method according to the present invention includes a first step of dividing a network chart or a logic circuit into strongly connected components, a second step of providing all arcs with weights every node of the above described strongly connected components having at least two nodes so that the inflow of arc weight may become equivalent to the outflow thereof, a third step of detecting an arc for which the weight in the above described strongly connected component becomes the maximum, and a fourth step of determining a disconnection point of a loop out of arcs for which the above described weights become the maximum or becomes its proportionate magnitude.

Another method according to the present invention includes a step of determining first coordinates of nodes on the basis of the above described first to fourth steps, a step of determining second coordinates of all nodes on the basis of arc relations between nodes having positional relations already determined and nodes having positional relations not yet determined, a step of adjusting placement of all nodes determined by the above described first and second coordinates in view of wiring of arcs between nodes, and a step of wiring arcs between nodes after placement of all nodes has been determined at the above described step of adjusting placement of all nodes.

A system according to the present invention includes first information holding means for holding arc-related information of respective nodes in a network chart, second information holding means for holding information relating to shapes of symbols placed on respective nodes, third information holding means for holding information relating to the placement and wiring of the network chart, fourth information holding means for holding information relating to patterns of respective placed symbols matched with the information held in the above described second information holding means, drawing means for drawing the network chart in a drawing apparatus on the basis of the information held in the above described third information holding means and the information held in the fourth information holding means, and computing processing means for executing the above described step of determining first coordinate values to the step of wiring arcs between nodes, and a step of producing information relating to the placement and wiring of the network chart and outputting this information to the third information holding means.

In the above described configuration according to the present invention, all portions included in a loop of a network chart are detected at a first step by deriving strongly connected components from connection relations of the network chart such as a logic circuit. As a result, detection of all loops is performed in the order proportionate to the number of nodes of the network chart.

At a second step, all arcs of that strongly connected component are provided with weights to calculate the flow rates of all arcs of that strongly connected component in the order proportionate to the number of those arcs.

Further, at third and fourth steps, all loops in the network chart are excluded by defining an arc having the largest flow rate as a disconnection point and levels are assigned to nodes. Therefore, the resulting feedback arcs of the network chart are reduced.

In accordance with another aspect of the present invention, first coordinates are determined on the basis of the above described first to fourth steps and positional relations of nodes at respective levels are determined, and thereafter position adjustment and wiring of nodes are performed.

Further in accordance with another aspect of the present invention, all the above-mentioned steps are executed on the basis of information of respective information holding means and placement and wiring information of a network chart is produced to draw the network chart.

As a result, a "readily understandable" network chart is automatically generated by means of efficient processing.

BRIEF DESCRIPTION OF THE DRAWINGS

FIG. 8 is a diagram showing an example of shape information;

FIG. 9 is a diagram showing an example of net information;

DESCRIPTION OF THE PREFERRED EMBODIMENT

Figure 1A:
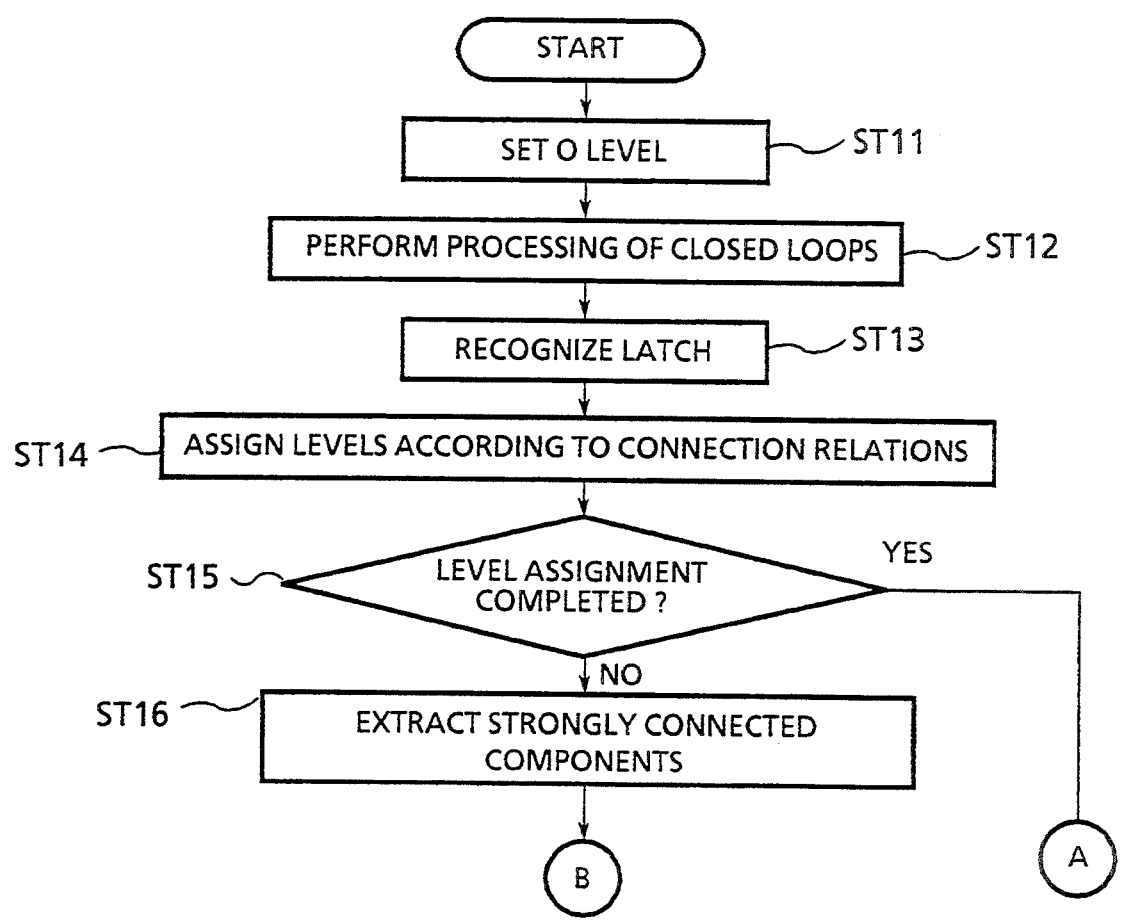
FIGS. 1A and 1B contain a flow chart showing an example of processing of assigning levels to nodes according to an embodiment of the present invention.

An embodiment of the present invention will hereafter be described in detail by referring to the drawings. The present embodiment will be described by taking automatic generation of a logic circuit diagram from connection information of a logic circuit, i.e., a net list as an example. However, the present invention can be applied to other network charts. That is to say, devices and cells are regarded as nodes, and connection lines and signal lines between cells and devices are regarded as arcs in general. Description will be made by identifying network charts with graphs and identifying devices with cells without notice.

Terms concerning graphs are explained hereinafter

A "graph" is a figure expressed by several points and segments of lines which connect each pair of points at the both ends (referred to as an "arc"). A "directed graph" is a graph in which the direction of each arc is considered. A graph G can be expressed by G =(V, E), where V represents a set of points and E a set of arcs. In a directed graph G=(V, E), when an arc (u, v) connects from a point u to another point v, the point u is referred to as a "father" of the point v and the point v is referred to as a "son" of the point u. When a point u has two sons v and w, v and w are referred to as a "brother" to each other. In $G_T$, when a point y can be reached from a point x, the point x is referred to as an "ancestor" and the point y a "descendant".

In a directed graph G=(V, e), when there is a directed path from a point u to another point v, or u =v, that is v can be reached from u, this relationship can be expressed by u→v. If we define a binomial relation "⇌" on V by "if u→v and v←u, then u⇌v", it is obvious that this relation is an equivalence relation in which the reflexive law, symmetric law and transitive law are satisfied. Now, assume that $V_1, V_2, \ldots, V_n$ belong to an equivalence class of V which has the equivalence relation ⇌, and $E_i$ are sets of arcs each having both ends in $V_i$ (i=1, 2, ..., p), partial graphs $G_i=(V_i, E_i)$ (i=1, 2, ..., p) of G can be uniquely determined. Each of $G_i=(V_i, E_i)$ thus obtained is referred to as a "strongly connected component" of G.

When a set of points V of a graph G=(V, E) is divided into two partial sets $V_1$ and $V_2$ (=V−$V_1$), and there exists such a V in which "any arc k∈E has its one end in $V_1$ and other end in $V_2$, such a G is referred to as a "bipartite graph".

When in a set of arcs M∈E of a graph G=(V, E), any two arcs k, l ∈E have no common ends, such a M is referred to as a "matching" of G. A matching G which has the maximum number of arcs among the matchings of G is referred to as a "maximum matching" of G.

[Description of Overall System Configuration]

Figure 7:
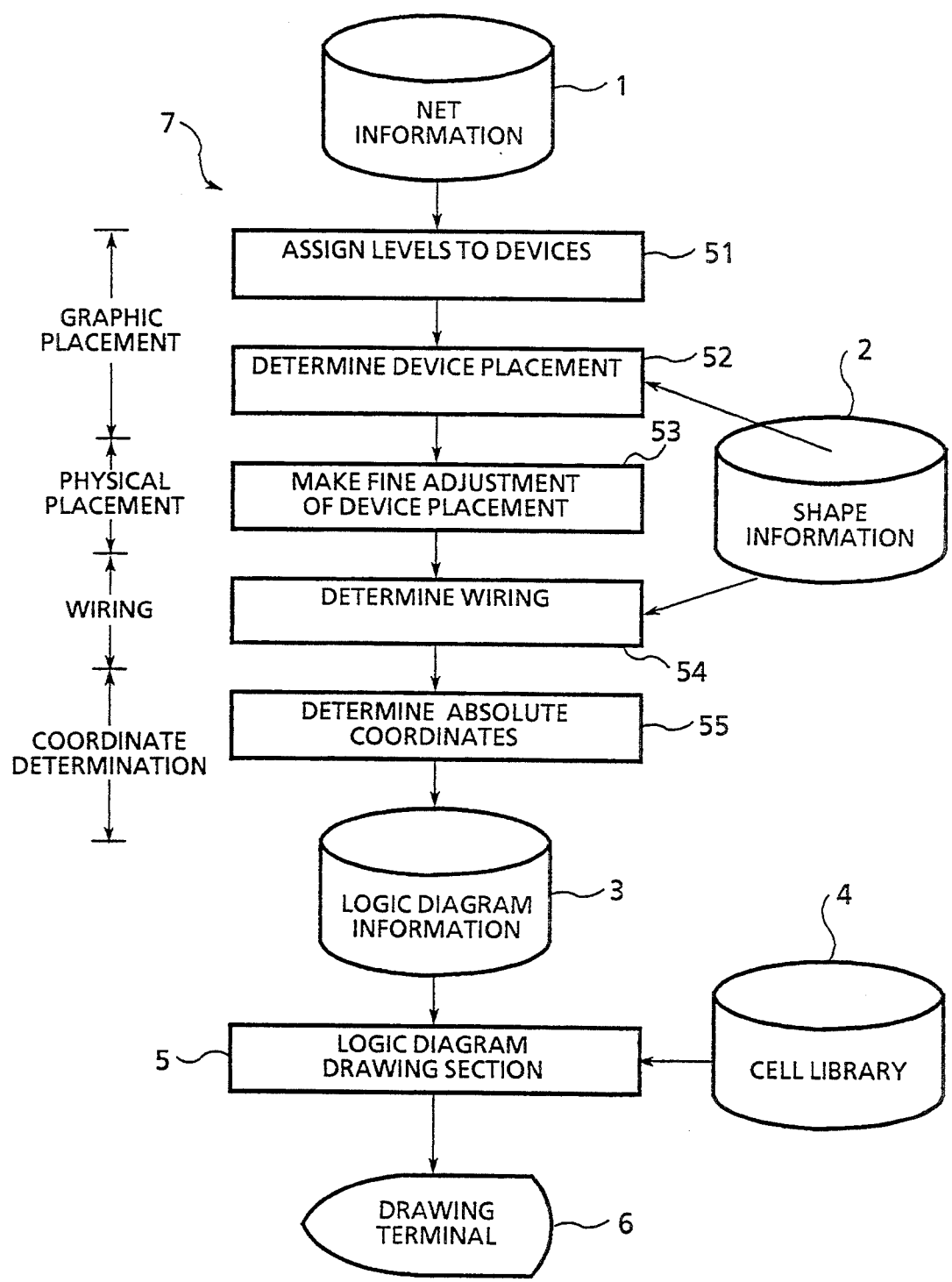
FIG. 7 is a configuration diagram of an embodiment of an automatic logic circuit diagram generation system according to the present invention.

FIG. 7 shows an embodiment of an automatic logic circuit diagram generation system. First of all, the configuration of the overall system will be described.

Numeral 1 denotes a net information file (first information holding means) for storing devices (inclusive of circuit components) and their connection information (arc-related information). Numeral 2 denotes a shape information file (second information holding means) for storing shape information of plotting symbols (placement symbols) representing respective devices. Numeral 3 denotes a logic diagram information file (third information holding means) for storing plotting information relating to placement and wiring of logic circuits (also referred to as logic diagrams). Numeral 4 denotes a cell library (fourth information holding means) for storing pattern information and function information of respective devices. The cell library 4 holds information relating to patterns of plotting symbols matched with information held in the shape information file 2. Numeral 5 denotes a logic diagram drawing section (drawing means) for receiving logic diagram information from the logic diagram information file 3 and the cell library 4 and for drawing a logic circuit in a drawing terminal 6 (drawing apparatus) such as a display or a plotter. Numerals 51 to 55 denote processing sections. The processing sections 51 to 55 form placement wiring processing means 7 which is a computing processing means for producing information relating to placement and wiring of a logic circuit diagram.

The above described net information file 1 holds therein a net list (connection information) of a logic circuit outputted from an automatic logic synthesis or automatic circuit conversion system, for example. The information held in this net information file 1 can be used for verification of logic, verification of timing, and automatic layout systems as well.

On the basis of the number of logic stages between an input port (input terminal) and each of devices included in a net list held in the net information file 1, the above described device level assignment processing section 51 determines the level of each device. The device level assignment processing section 51 is so configured as to perform level assignment by means of a method which will be described later.

The above described device placement determining processing section 52 determines positional relations in a direction perpendicular to the level direction between devices of a reference level, i.e., sequence relations of arranging devices in a direction perpendicular to the level direction. Further, on the basis of sequence relations of positions of elements, i.e., devices of the reference level, this device placement determining processing section 52 successively determines sequence relations of positions of elements of next levels (next levels in the descending order in case of the present embodiment) and determines sequence relations of positions for all elements of the logic circuit.

For brevity, the present embodiment will be described assuming that the maximum level, i.e., a level having an output port, is the reference. However, a level having an input port, i.e., 0 level may be defined as the reference level. Alternatively, a device or a circuit component extending over a plurality of levels may be defined as the reference.

The level assignment processing section 51 and the placement determining processing section 52 are so configured as to execute the step of determining first coordinates of nodes and the step of determining second coordinates of all nodes. Shapes of placement elements, i.e., shapes of plotting symbols of devices are not considered. Therefore, the processing sections 51 and 52 determine the level of each element (device) as a first coordinate (first global coordinate), determine a sequent order derived from sequence relations of positions as a second coordinate (second global coordinate), and determine graphic placement of elements having no relations to shapes.

In the present embodiment, the sequence relations of positions of each level are determined in the descending order of levels. In case the reference level is defined as the 0 level, the sequence relations must be determined in the ascending order. In other cases, the sequence relations must be determined in both ascending and descending directions of levels.

On the other hand, the above described shape information file 2 holds information relating to shapes of plotting symbols appearing in the logic circuit. An example of shape information held in this shape information file 2 is shown in FIG. 8. In FIG. 8, sizes of plotting symbols of an inverter, a 2-input AND gate and a 3-input AND gate, positions in(i) and in(ia) of input pins, and a position out(o) of an output pin are represented by relative coordinates from reference points of respective symbols. The size of a plotting symbol is indicated by a pair of minimum coordinate and maximum coordinate of vertexes of a rectangle circumscribed about that plotting symbol.

The above described device placement fine adjustment processing section 53 is so configured as to execute the step of adjusting placement of all nodes determined by the first and second coordinates in view of wiring of arcs between nodes. On the basis of the first coordinate an the second coordinate of each placement element determined by the above described processing sections 51 and 52, the processing section 53 determines rough placement of each placement element. The processing section 53 determines a pin whereto the signal line of each element should be connected by using the shape information of each placement element so that bending portions and intersections may be reduced. The processing section 53 thus assigns signals to pins and determines the sense of each placement element and the detailed coordinates of each placement element. Therefore, this fine adjustment processing section 53 performs physical placement in due consideration of the sense (inclusive of mirror inversion) of each placement element and positions and sizes of pins, and determines placement of placement elements on the drawing.

The above described wiring determining processing section 54 is so configured as to execute the step of wiring arcs between nodes after placement of all nodes has been determined at the above described step of adjusting placement of all nodes. The processing section 54 successively performs wiring every level for connection signals between placement elements determined by the above described placement determining processing section 52, and determines wiring among all placement elements. The present embodiment will be described for only the case where wiring is successively performed from the output port side in the descending order every level. However, an alternative method may also be used.

Coordinates of wiring are represented by global coordinates, which are the first and second coordinates determined by the level assignment processing section 51 and the placement determining processing section 52, and local coordinates, which are detailed coordinates of the fine adjustment processing section 53.

The above described coordinate determining processing section 55 is so configured as to execute the step of producing information relating to the placement and wiring of the network chart and outputting this information to the third information holding means. On the basis of the global coordinates and local coordinates representing the placement position of each placement element and wiring positions derived by the processing sections 51 to 54 heretofore described, the coordinate determining processing section 55 determines absolute coordinates of placement and wiring of the entire logic circuit diagram and outputs them to the logic diagram information file 3.

Figures 10, 11:
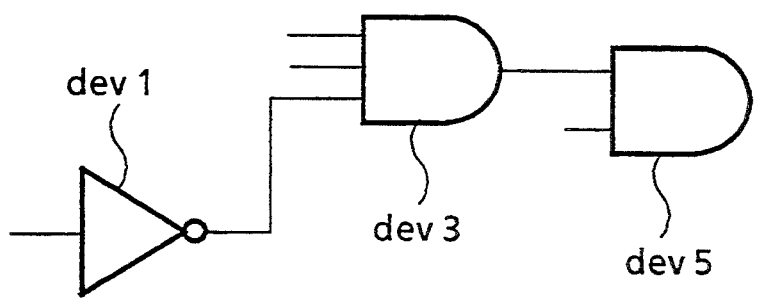
FIG. 10 is a diagram showing an example of logic diagram information.
FIG. 11 is a logic circuit diagram showing an example of an outputted logic circuit diagram.

FIG. 9 shows an example of a net list held in the above described net information file 1. In FIG. 9, it is indicated that a device dev1 has a cell name inv00, an input signal k1, and an output signal net1. The shape information shown in FIG. 8 is held in the shape information file 2 beforehand. By inputting the information shown in FIG. 9 and executing the processing sections 51 to 55, logic diagram information is held in the logic diagram information file 3. An example of this logic diagram information is shown in FIG. 10. FIG. 10 shows placement information indicating that the position of a reference point of the device dev1 having the cell name inv00 has coordinates (12, 13) and the angle of rotation thereof is 0, mirror inversion not being performed. FIG. 10 also shows wiring information indicating that end points of a signal line having the signal name net1 have coordinates (17, 13) and (25, 18) and coordinates (17, 13), (21, 13), (21, 18) and (25, 18) are connected.

By inputting the logic diagram information shown in FIG. 10 to the logic diagram drawing section 5, a logic diagram as shown in FIG. 11 is outputted to the drawing terminal 6 such as a display or a plotter.

The logic diagram drawing section 5 is typically a logic diagram input editing system (schematic editor). This logic diagram input editing system is furnished with the cell library 4 and the drawing terminal 6. At this time, the information held in the shape information file 2 must be matched with the contents of the cell library 4.

The processing sections 51 to 54 such as level assignment will hereafter be described in detail.

[Level Assignment to Devices]

The level assignment to devices is a feature of the present invention. On the basis of a typical network chart, the level assignment to devices will now be described by defining devices as nodes and connection lines as arcs.

Figure 1B:
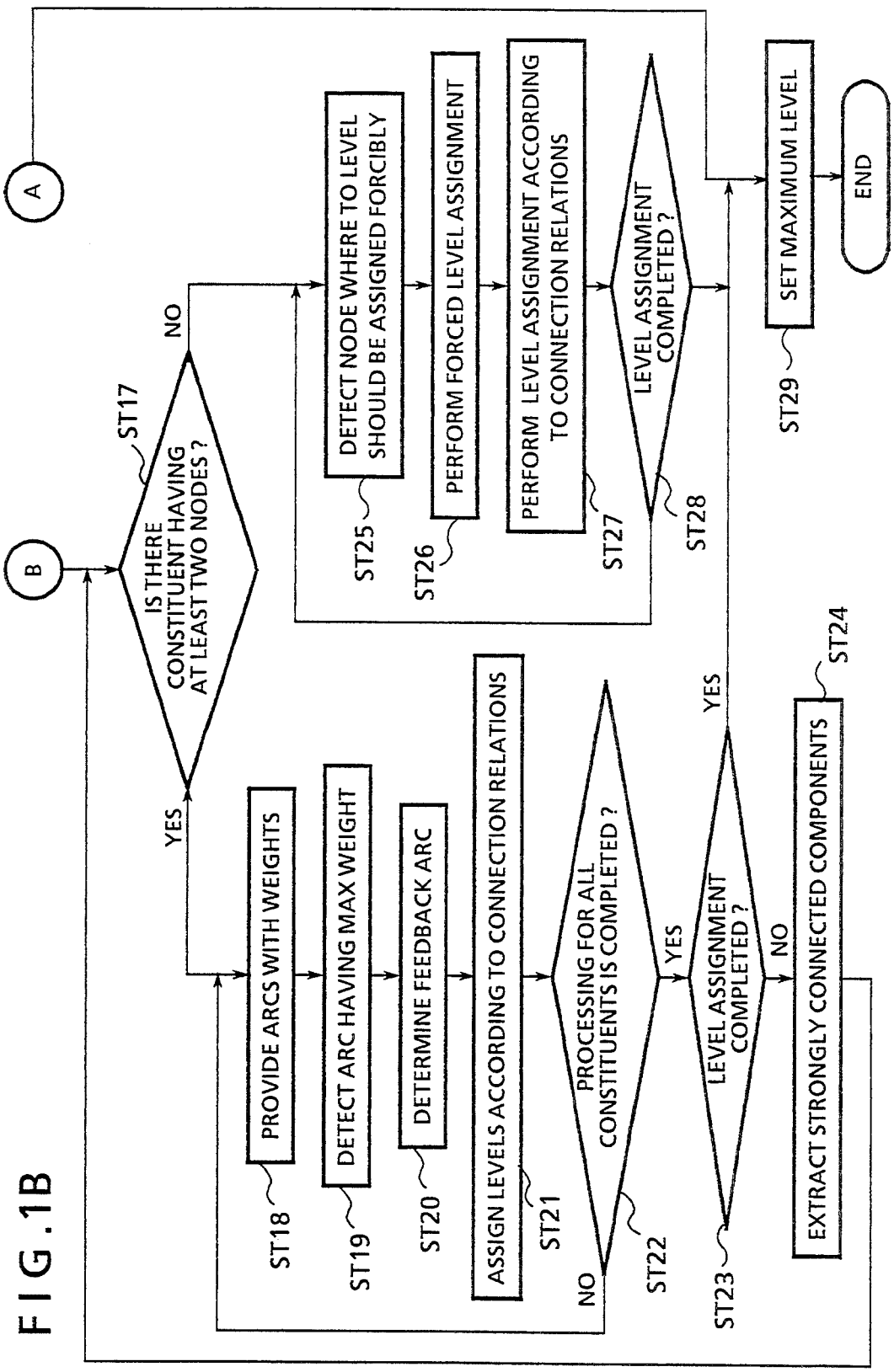

FIGS. 1A and 1B are flow charts showing an example of detailed processing procedure for assigning levels to nodes. In FIG. 1A, a 0 level is set at step ST11. In the embodiment of the logic circuit diagram, for example, all of input ports are set at 0 levels. For a typical network chart, however, a node having no input may be set at the 0 level.

Step ST12 forms a step of performing processing of a self-closed loop. Out of arcs included in the network chart, all of self-closed loops each having a starting point node of an arc identical with an end point node thereof are detected. Those arcs forming self-closed loops are defined as feedback arcs (feedback wiring).

At step ST13, recognition processing of latches is performed. Out of loops (inclusive of cycles) each having two nodes, loops having latch structures are recognized. That is to say, pairs of nodes (devices), i.e., latch pairs are derived, and two arcs forming the loop are defined as feedback arcs. Thereafter, succeeding processing is performed by making levels of the pair equivalent. As a simple method, for example, the latch pair is regarded as one node and succeeding level assigning processing is performed. In case one node is included in a plurality of pairs of latches, however, a method of selecting a latch pair so that a latch pair having less input arcs may be given priority, for example, is considered.

Step ST14 forms a step of assigning levels according to connection relations (parential relations using arcs). For arcs other than feedback arcs inputted to that node, levels are assigned to all nodes outputting those arcs. If those levels have a maximum value L, the level of that node is defined as L+1. By such a method, levels are successively assigned to respective nodes.

For the above described latch pair, there is a method of performing processing as if the latch pair is one node as a simple method.

At step ST15, decision processing is performed. It is determined whether level assignment to all levels has been completed. If completed, processing proceeds to step ST29 to execute processing of setting a maximum level. If not yet completed, processing proceeds to step ST16 to execute processing of extracting strongly connected components.

In the embodiment of the logic circuit diagram, for example, steps ST14 and ST15 are applied to all nodes excepting output ports.

Step ST16 forms a first step of performing processing for extracting strongly connected components. At step ST16, strongly connected components (strongly connected portions) are derived from a graph including all nodes and all arcs (excepting feedback arcs) of the network chart. In the succeeding processing, for all of strongly connected components each having at least two nodes among the strongly connected components derived at step ST16, steps ST18 to ST22 are executed by defining those strongly connected components as subgraphs.

Details of a way of deriving strongly connected components (strongly connected portions) are described in "Iwanami Course of Lectures-Information Engineering 10: Fundamental Algorithm" published by Iwanami Shoten in 1983, pp. 57-60, for example.

In FIG. 1B, step ST17 forms step of performing decision processing. At step ST17, it is determined whether a strongly connected component having at least two nodes is included in strongly connected components derived by processing of extracting strongly connected components performed at the above described step ST16 and step ST24 which will be described later. If there is a strongly connected component having at least two nodes, then processing for the loop remains and hence processing of steps ST18 to ST22 is executed. If there is not a strongly connected component having at least two nodes, then the processing for that loop has been completed and hence processing of steps ST25 to ST28 is executed. Processing of the steps ST18 to ST22 which will hereafter be described is executed repetitively for each of the above described strongly connected components having at least two nodes.

Step ST18 forms a step of performing processing for weighting arcs. Respective arcs of the above described strongly connected components having at least two nodes are weighted as described below. That is to say, weighting is performed for each node so that the total sum of weights of input arcs to that node may become equal to the total sum of weights of output arcs from that node and respective weights may be minimized.

This will now be described in detail. It is now assumed that U denotes a set of nodes included in the above described strongly connected component $G=(U, E)$ and E denotes a set of arcs included in the strongly connected component $G=(U, E)$. For node i and node j (i, j∈U), it is now assumed that weight $X_{ij}$ of an arc (i, j)∈E is represented as $X_{ij} \geq 1$, (i, j)∈E. Then, for each node i (∈U), a linear programming problem (LP problem) is so solved as to satisfy the condition $$\Sigma X_{ij} - \Sigma X_{ji} = 0$$
$$j \in A(i) \quad j \in B(i)$$

where $$A(i) = \{j \in U | (i, j) \in E\}$$

$$B(i) = \{j \in U | (j, i) \in E\}$$

and minimize the following object function.
$$Z = \Sigma X_{ij}, (i, j) \in E$$

Thereby weight $X_{ij}$ of each arc is derived. For brevity, however, it is now assumed that the arc weight $X_{ij}$ is a positive integer.

Linear programming problems (LP problems) are described in "Exercise of Graph Theory: Foundation and Application", Corona Publishing Co., Ltd., 1983, pp. 158–165.

Figure 4:
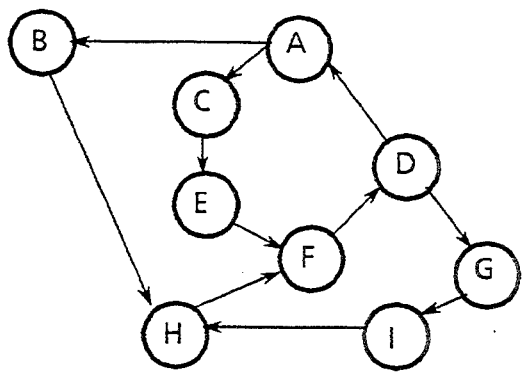
FIG. 4 is a diagram showing an example of a strongly connected component of a network chart.

Hereafter, description will be given on the basis of a specific example. FIG. 4 shows an example of a coupling constituent of the network chart. In FIG. 4, weights of arcs are derived as described below. That is to say, weights $X_i$ of arcs are so set as to be X1 for arc A→B, X2 for arc B→H, X3 for arc H→F, X4 for arc F→D, X5 for arc D→A, X6 for arc A→C, X7 for arc C→E, X8 for arc E→F, X9 for arc D→G, X10 for arc G→I, and X11 for arc I→H. The weights $X_i$ (i=1, ..., 11) are so derived as to satisfy relations $X_i \geq 1$ (i=1, ..., 11)
X1=X2
X2+X11=X3
X3+X8=X4
X4=X5+X9
X5=X1+X6
X6=X7
X7=X8
X9=X10 and
X10=X11 and minimize the following object function.
z=X1+X2+X3+X4+X5+X6+X7+X8+X9+X10+X11

As a result, the following relations are obtained.
X1=1
X2=1
X3=2
X4=3
X5=2
X6=1
X7=1
X8=1
X9=1
X10=1 and
X11=1

Figure 5:
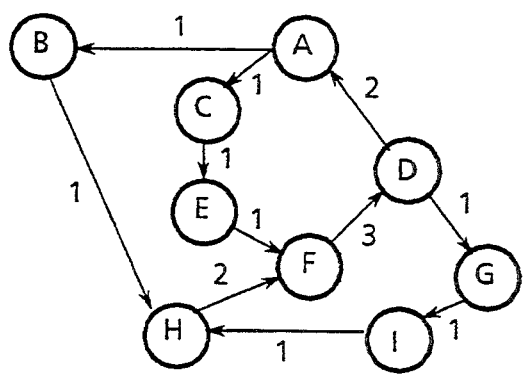
FIG. 5 is a diagram showing an example of providing arcs of a strongly connected component of a network chart with weights.

As shown in FIG. 5, weights of respective arcs are thus derived.

Step ST19 forms a step of performing processing for detecting an arc having a maximum weight. At the step ST19, an arc having the largest weight value among weights of arcs derived at the above described step ST18 is detected. In the example of FIG. 5, for example, the weight of the arc F→D is 3 and the maximum value.

In the present embodiment, one arc has the maximum weight. In case a plurality of arcs have a maximum weight, however, all of those arcs are derived.

Step ST20 forms a step of determining a feedback arc. Out of arcs having the maximum weight detected at the above described step ST19, an arc to be used as a feedback arc is selected and determined at the step ST20. That is to say, that arc is defined as a feedback arc to determine a disconnection point and succeeding processing is executed. In the embodiment of FIG. 5, for example, the arc F→D becomes the feedback arc.

In case there are a plurality of arcs having a maximum weight, feedback arc determination is made in the present embodiment by means of a method of making selections from starting point nodes of input arcs to nodes having those plurality of arcs as inputs while giving priority in the order of (1) fewer nodes having undetermined levels, (2) a larger number of nodes having assigned levels, and (3) such nodes that the maximum level of nodes having assigned levels is low. As regards application of the above described priority rules (1), (2) and (3), however, various combinations may also be used.

In the present embodiment, the case where the arc weight becomes the maximum has been considered. As a matter of fact, however, the present invention can be applied to the case where the sum of weights of a plurality of arcs having the same signal-name becomes the maximum as in a logic circuit diagram, for example.

Step ST21 performs level assigning processing according to connection relations in the same way as the above described step ST14, in which levels are assigned to nodes for the above described strongly connected components.

If there is a node having no arcs inputted thereto other than the feedback arc when the processing of the step ST21 is executed, it is also possible to assign a level to that node in the same way as processing of step ST26 which will be described later.

At step ST22, decision processing is performed. For all of the above described strongly connected components each having at least two nodes, it is determined at this step whether the processing of a series of steps ST18 to ST21 has been completed. If completed, processing of step ST23 is executed. If not yet completed, processing of a series of steps ST18 to ST21 is repeatedly executed for strongly connected components not yet completed.

Step ST23 forms a step of performing decision processing. In the same way as the above described step ST15, it is determined at the step ST23 whether level assignment to all nodes has been completed. If it is completed, processing of setting a maximum level is executed at step ST29. If it is not completed, processing of extracting strongly connected components is executed at step ST24.

Step ST24 forms a step of performing processing for extracting strongly connected components. In the same way as the above described step ST16, strongly connected components (strongly connected portions) are derived at the step ST24. For attaining higher speed of processing, however, a new strongly connected component (strongly connected portion) is derived for each of the above described strongly connected components from a subgraph including all nodes and all arcs (exclusive of a newly determined feedback arc) of that strongly connected component. In the present processing, new strongly connected components are extracted and thereafter decision processing of the above described step ST17 is executed again.

At step ST25, nodes which should have forcibly assigned levels are detected. From nodes whereto levels are not assigned at the above described steps ST14 to ST21, a node whereto a level should be assigned subsequently is determined at the step ST25. To be specific, a node having no input arcs is selected. (In this case, a feedback arc may be inputted to that node.)

Step ST26 forms a step of performing forced level assignment processing. For example, nodes are traced in the output direction of that node. By calculating back from the level of a node having an input arc extending from a node having an assigned level reached first, a level is determined. Alternatively, the level of that node is defined as 1 or 0.

At step ST27, level assignment processing according to connection relations is performed. In the same way as the above described step ST14, node level assignment is performed at the step ST27.

At step ST28, decision processing is performed. In the same way as the processing of the above described step ST15, it is determined whether level assignment to all nodes has been completed. If completed, the maximum level setting processing is executed at the step ST29. If not completed, the processing of the above described step ST25 is executed again.

Finally, naximum level setting processing is performed at step ST29. Assuming that the maximum level of nodes having assigned levels is N, levels of all output ports are defined as N+1 level and processing is finished.

The steps ST14, ST21 and ST27 may be implemented by the same processing. The steps ST15, ST23 and ST28 may be implemented by the same processing. The steps ST16 and ST24 may be implemented by the same processing. Further, in the steps ST14 to ST28, processing may be performed by regarding a pair of latches as one node for brevity.

Figure 6:
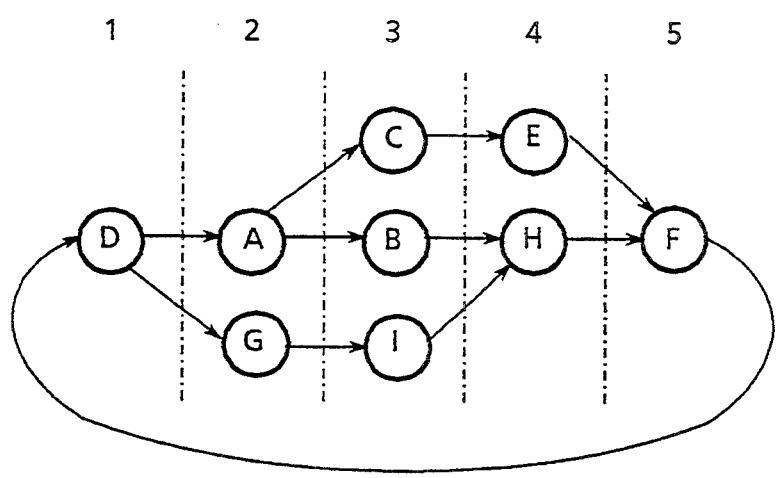
FIG. 6 is a network chart showing an example of a network chart whereto levels have been assigned.

In the present embodiment, therefore, levels are assigned as shown in FIG. 6 to the strongly connected components of FIG. 4. That is to say, there are three loops in the strongly connected components of FIG. 4. In the worst case, there are three feedback arcs. In the network chart of FIG. 6, however, there is only one feedback arc F→D and signals flow from the left to the right, resulting in a readily understandable drawing.

With reference to FIG. 1A, the self-closed loop processing of the step ST12 and the latch recognition processing of the step ST13 are performed at different steps. However, they may be processed at the same step. Further, they are processed en bloc in the first place. However, they may be executed before the step ST16 or the step ST17 in FIG. 1B.

Figure 2:
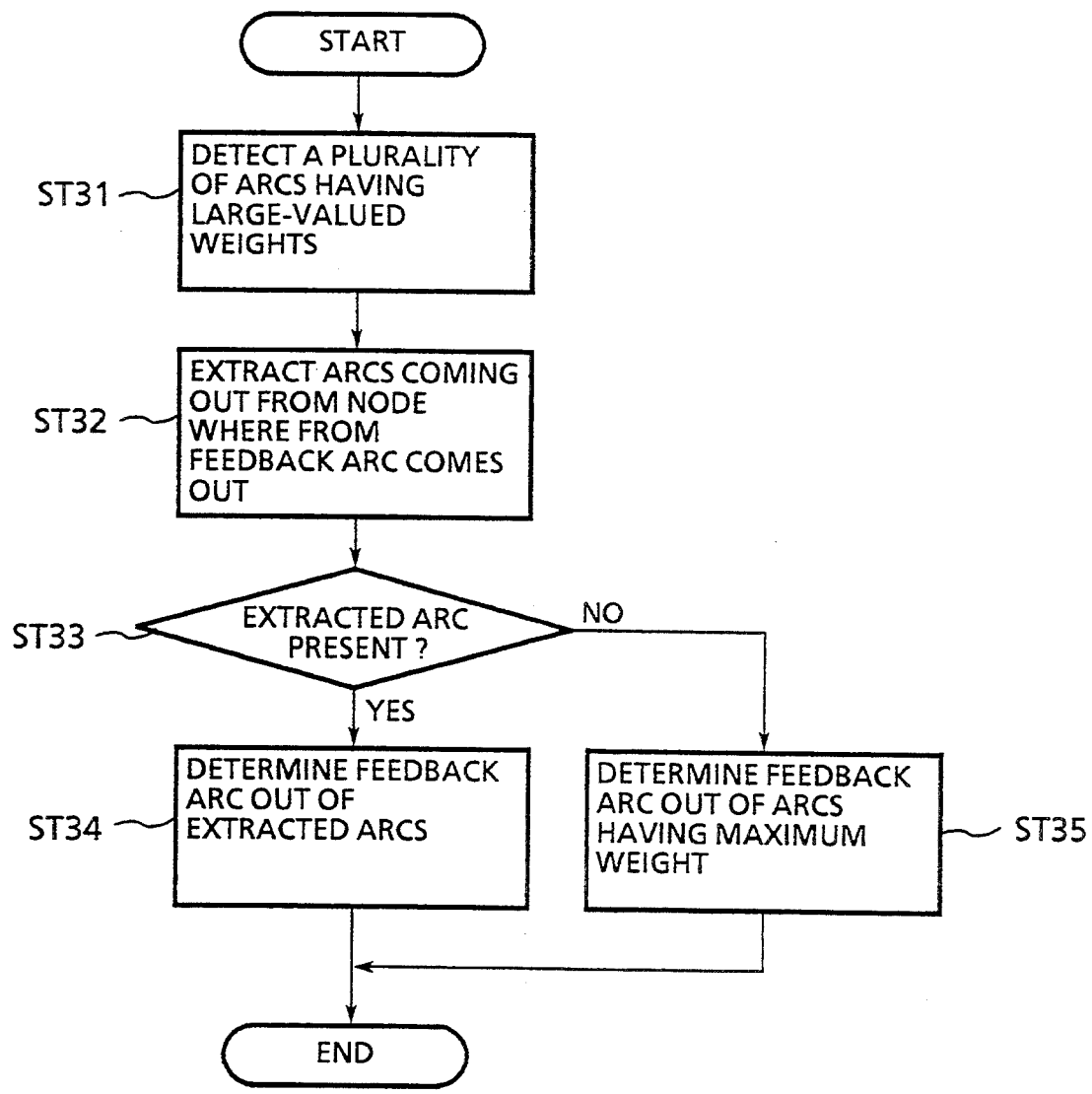
FIG. 2 is a flow chart showing another embodiment of steps ST 19 and 20 of FIG. 1B.
Figure 3:
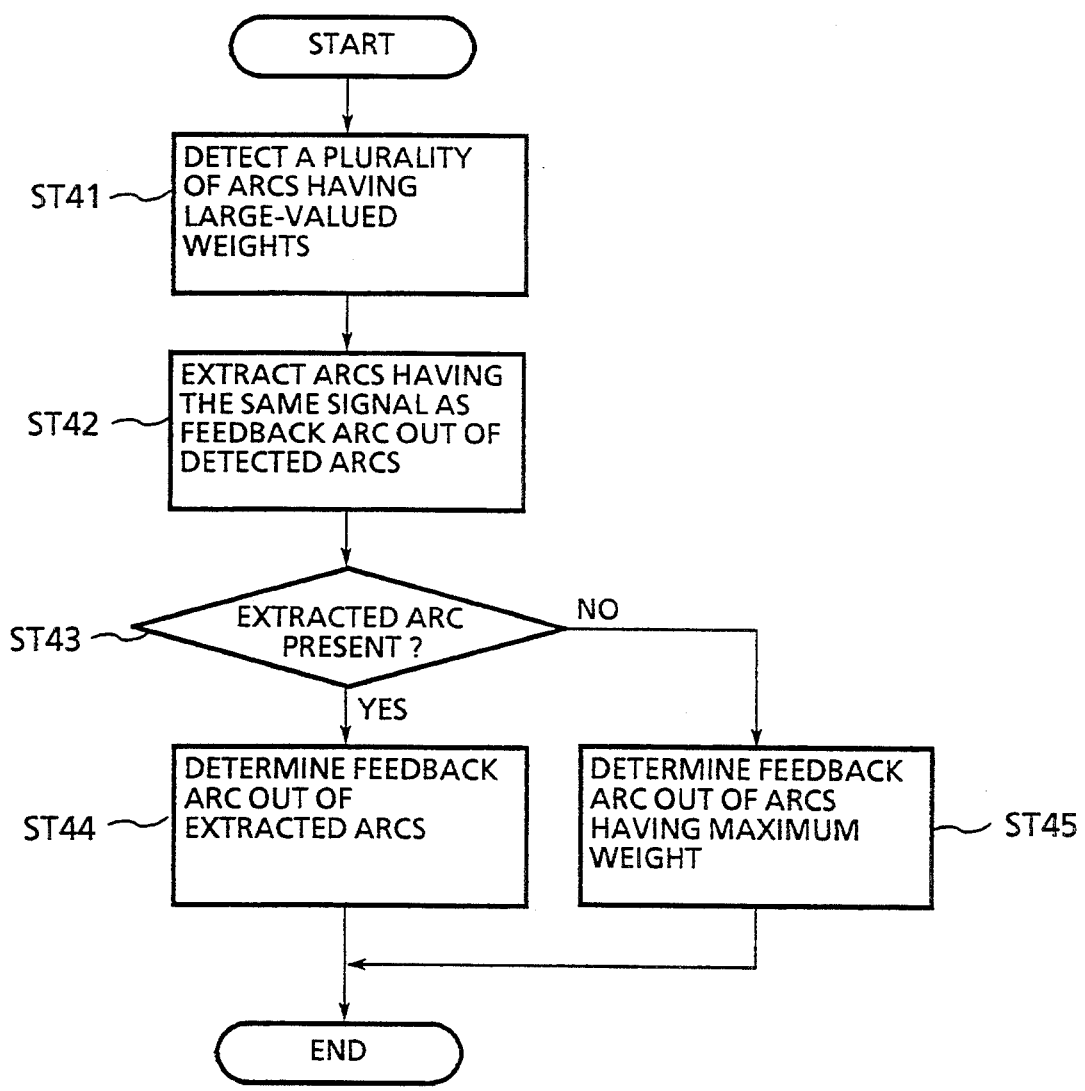
FIG. 3 is a flow chart in case of application of the flow of FIG. 2 to a logic circuit.

FIGS. 2 and 3 show other embodiments of the steps ST19 and ST20 illustrated in FIG. 1B.

FIG. 2 is a flow chart showing an example of a detailed processing procedure for determining a feedback arc on the basis of weights assigned to arcs of strongly connected components.

At step ST31, a plurality of arcs having a maximum weight value and its proportionate weight values among weights of arcs derived at the above described step ST18 are detected. The proportionate value can be defined in various ways. For example, the proportionate value can be defined as the greatest value but the maximum value or a value equivalent to the maximum value less approximately 1 to 2.

At step ST32, all arcs coming out from the same node as the node wherefrom a feedback arc of the network chart already determined comes out are detected out of the arcs detected at the above described step ST31.

At step ST33, it is determined whether a pertinent arc has been extracted at the above described step ST32. If an extracted arc is present, processing of step ST34 is executed. If an extracted arc is not present, processing of step ST35 is executed.

At step ST34, a feedback arc is determined out of arcs extracted at the above described step ST32 in the same way as the processing of the above described step ST20, and a disconnection point is determined.

At step ST35, a feedback arc is determined out of arcs having the maximum weight detected at the above described step ST31 in the same way as the processing of the above described step ST20, and a disconnection point is determined.

In this embodiment, arcs already sharing the node of the starting point of the feedback arc of the network chart are defined as feedback arcs by priority. In the case of a network chart sharing a plurality of arcs coming out from the same node, therefore, feedback arcs are reduced, a readily understandable network chart being automatically generated.

FIG. 3 shows another embodiment in case the network chart is limited to logic circuits. A substitute of the steps ST19 and ST20 is shown. FIG. 3 is thus a flow chart showing an example of a detailed processing procedure for determining feedback wiring (feedback arc).

At step ST41, processing similar to that of the above described step ST31 is performed and a plurality of connection lines (arcs) having a maximum weight value and its proportionate values are detected.

Out of the connection lines (arcs) detected at the above described step ST41, all connection lines (arcs) representing the same signal as that of the feedback wiring (feedback arc) of the logic circuit already determined, i.e., all connection lines having the same signal name are extracted at step ST42.

At step ST43, it is determined whether a pertinent connection line (arc) has been detected at the above described step ST42. If an extracted connection line (arc) is present, step ST44 is executed. If no connection lines (arcs) have not been extracted, processing of step ST45 is executed.

At step ST44, processing similar to that of the above described step ST34 is performed. Out of connection lines (arcs) extracted at the above described step ST42, feedback wiring (a feedback arc) is determined and a disconnection point is determined at the step ST44.

At step ST45, processing similar to that of the above described step ST35 is performed. Out of connection lines (arcs) having the maximum weight included in the connection lines (arcs) detected at the above described step ST41, feedback wiring (a feedback arc) is determined.

In this embodiment, connection lines (arcs) having the same signal as that of the signal line already determined as the feedback wiring (feedback arc) of the logic diagram are defined as feedback wiring (feedback arcs) by priority. Therefore, feedback lines (feedback arcs) are reduced and a readily understandable logic circuit diagram can be automatically generated.

[Determination of Device Placement]

Figure 12:
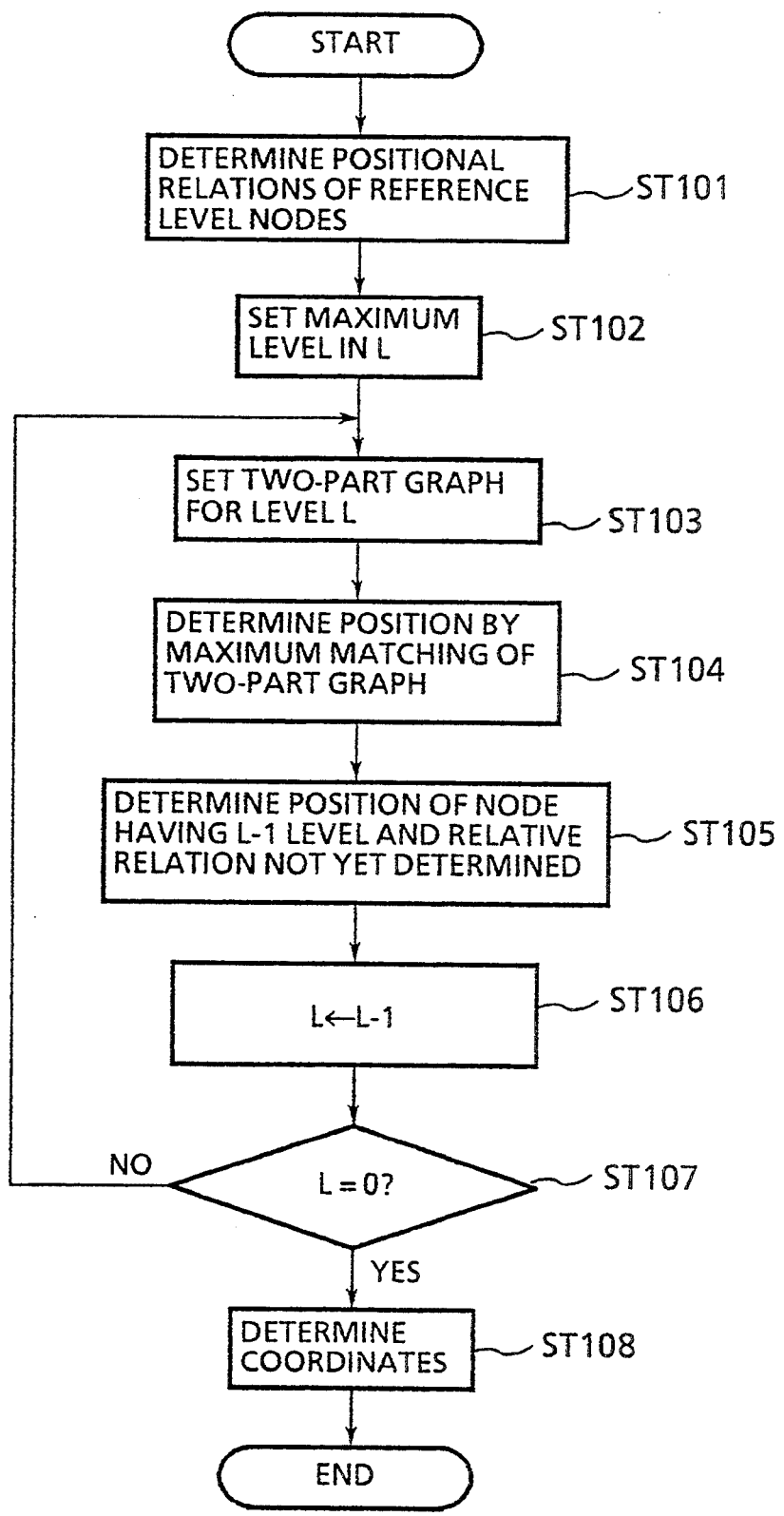
FIG. 12 is a flow chart showing an example of processing of determining placement of devices.

FIG. 12 is a flow chart showing an example of a detailed processing procedure of the above described device placement determining processing section 52. Each processing step will hereafter be described specifically by defining devices as nodes and connection lines as arcs.

At step ST101, positional relations of nodes of a reference level (output ports in the present embodiment) are determined.

First of all, pairs of nodes of the reference level are set without duplication. For every pair, a common ancestor of that pair is detected by a method described below. The level difference (generation difference) between the common ancestor and that pair and the degree of consanguinity are calculated. On the basis of the level difference between each pair and the common ancestor and the degree of consanguinity thus calculated, the degree of junction between pairs is then determined. Positional relations between nodes of the reference level are so determined that a pair having a larger degree of junction may have a closer relation.

As for a method for detecting the common ancestor, an ancestor having a smaller level difference with respect to the pair or an ancestor having a smaller sum of the numbers of arcs extending from two nodes of the pair is detected by priority. Further, the degree of consanguinity of two nodes means the minimum value of sum of the numbers of arcs existing on the path extending from nodes to their common ancestor. For pairs having no common ancestors detected, however, the level difference from the common ancestor and the degree of consanguinity are not calculated.

Further, the degree of junction is so determined that it may become larger as the level difference from the common ancestor becomes smaller and it may become larger as the degree of consanguinity becomes smaller.

In the present embodiment, nodes of the reference level are limited to only output ports for brevity. As a matter of fact, however, the present invention can be applied to the case where the positional relation between nodes including a device or a circuit component other than output ports is to be determined.

At step ST102, the maximum level, i.e., the output port level is set in a level counter L.

At step ST103, a bipartite graph for the L level is produced. To be specific, a set including all nodes of the L level or higher having relative positions already determined (referred to as set having relative positions already determined) is derived. Further, a sum set (referred to as set having relative positions not yet determined) is derived from a set obtained by assembling all nodes outputting input arcs to nodes of the set having relative positions already determined in accordance with the connection relations of the above described net list and a set of nodes of L-1 level. That is to say, a bipartite graph including the set having relative positions already determined, the set having relative positions not yet determined, and arc relations (connection relations) between those sets is extracted and used at a succeeding step ST104.

In the bipartite graph extracted at the above described step ST103, a pair of nodes associated by the maximum matching of the bipartite graph is so determined at the step ST104 as to have the same relative position.

The bipartite graph and maximum matching of the bipartite graph are described in "Exercise of Graph Theory: Foundation and Application" Corona Publishing Co., Ltd., 1983, for example.

Figure 13:
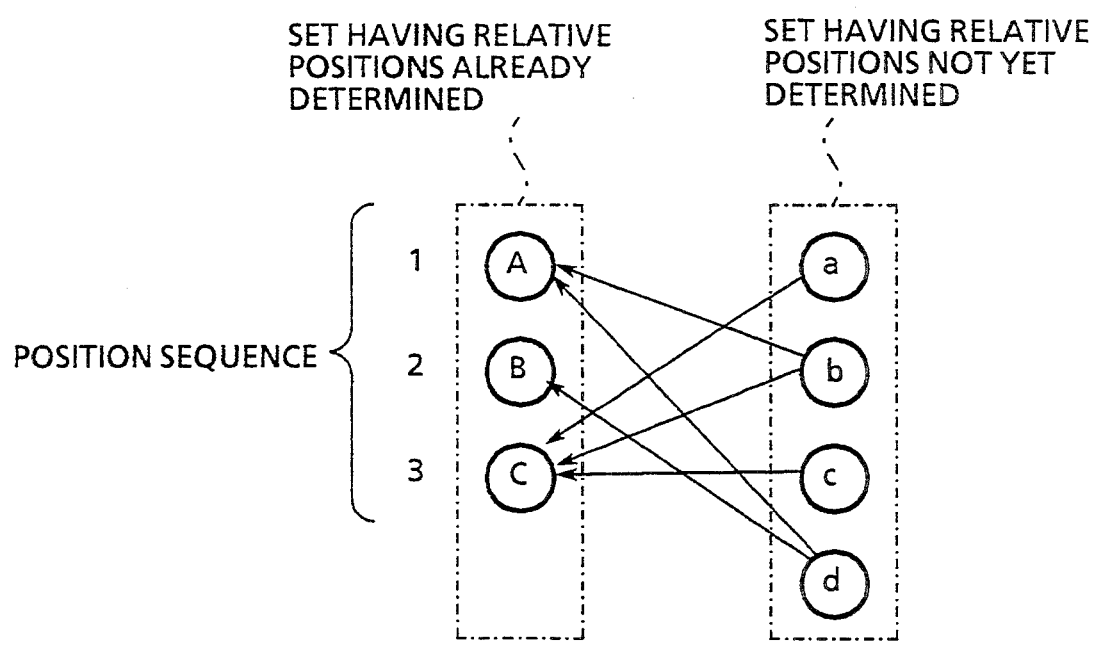
FIG. 13 is a diagram for explaining a two-part graph.
Figure 14:
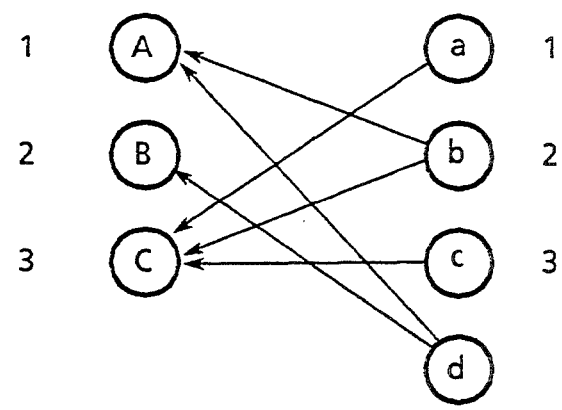
FIG. 14 is a diagram for explaining maximum matching of a two-part graph.

If the step ST104 is executed for an example of the bipartite graph shown in FIG. 13, for example, nodes A, B, and C are respectively matched (associated) with nodes b, d, and a to attain maximum matching as shown in FIG. 14. Therefore, A and b are located at the same relative position, B and d are located at the same relative position, and C and a are located at the same position.

In case there are a plurality of ways of maximum matching, a way of matching having a larger level difference between matched nodes is given priority. In FIG. 14, for example, there are two ways of matching as maximum matching. In one way of matching, A, B and C are matched with b, d and a, respectively. In the other way of matching, A, B and C are matched with b, d and c, respectively. If the level difference between the node C and the node a is larger than the level difference between the node C and the node c, the maximum matching including matches A-b, B-d and C-a is selected.

At step ST105, relative positions of nodes of the L-1 level, relative positions of which have not been determined at the above described step ST104, are determined. That is to say, for a node having the level L-1 included in a set obtained by excluding nodes, relative positions of which have been determined at the above described step ST104, from the above described set having relative positions not yet determined, a node having a relative position not yet determined is embedded in a position located at or near the centroid of relative positions of nodes having relative positions already determined and having arc relations with respect to the above described node having the L-1 level.

In FIG. 14, for example, the centroid of the node c to be derived has the same relative position as the node a. Therefore, the node c may be embedded either between the node d and the node a or under the node a. In this case, the node c is embedded under the node a.

At step ST106, the count in the level counter L is decreased by 1 in order to perform similar processing for the L-1 level as well.

At step ST107, it is determined whether the count in the level counter L is 0. If the count is 0, processing of step ST108 is executed. If the count is not 0, processing of the steps ST103 to ST107 is executed repeatedly.

Finally, on the basis of the relative position of each node heretofore described, the coordinate of each node in a direction perpendicular to the level is determined at the step ST108. In FIG. 14, for example, A and b have a coordinate value 1 and B and d have a coordinate value 2, whereas C and a have a coordinate value 3 and c has a coordinate value 4.

By execution of the above described device placement determining processing section 52, a readily understandable logic circuit diagram can be efficiently generated so that overall connection relations may be easily grasped.

[Fine Adjustment of Device Placement]

Processing operation of the above described device placement fine adjustment processing section 53 will now be described in detail. By using the positional relation depending upon coordinates of each placement element, i.e., global coordinates and shape information stored in the shape information file 2, signal assignment to the pins of respective placement elements (nodes) and detailed positions of respective placement elements are determined. For brevity, however, description will now be given for the case where respective placement elements of the logic circuit diagram are directed from the left to the right side, i.e., the case where the degree of rotation is 0.

First of all, a method of assigning signals to pins will now be described. With respect to the position of a placement element where a signal is assigned to a pin, the wiring pattern of an input signal line to the placement element is predicted from the position of the start point element of that input signal line, i.e., a global first coordinate (a coordinate in the horizontal direction in the case of the present example) and a global second coordinate (a coordinate in the vertical direction in the case of the present example). Those signal lines are so assignd to input pins that intersections of wiring may be reduced.

Subjects of pin assignment are limited to logically equivalent pins. Instead of pin assignment, a combination with the rotation of a placement element or mirror inversion may be used. Thereby wiring with fewer intersections can be performed.

Determination of detailed coordinates of each placement element will now be described. Depending upon the shape of the placement element, positions of input and output pins change variously. In case placement elements are placed according to only global coordinates, therefore, wiring between placement elements is not always straight even if global second coordinates are the same. In the present embodiment, therefore, local second coordinates of respective placement elements are determined so that an output pin of one of adjacent placement elements having the same global second coordinate and an input pin of the other of the adjacent placement elements connected to the above described output pin may be placed on the same second coordinate (the same coordinate in the vertical direction), i.e., the wiring between them may become straight.

Figure 15:
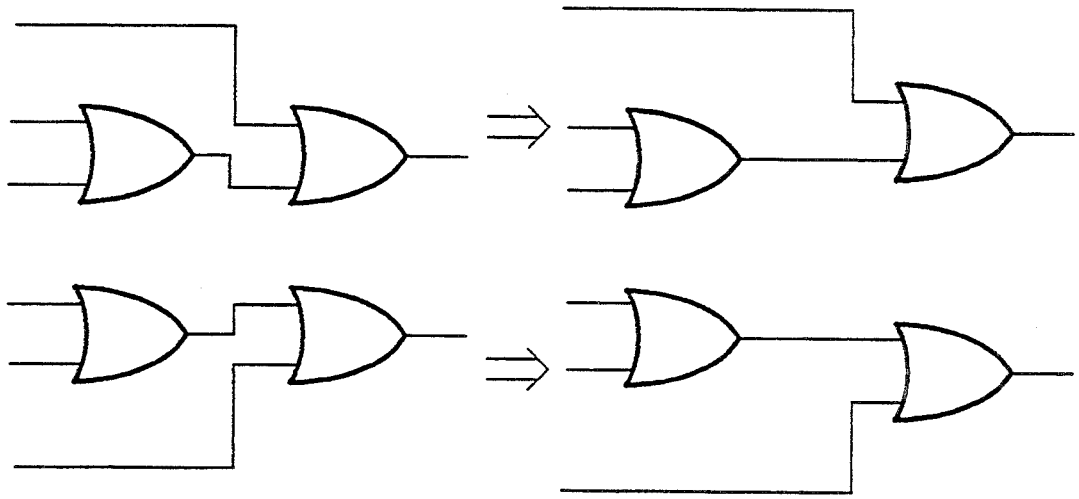
FIG. 15 is a diagram for explaining determination of detailed positions of placement elements.

If placement is performed according to only global coordinates, for example, the position of the input pin is displaced from the position of the output pin and hence the wiring is bent as shown in FIG. 15. By setting local coordinates so that the position of the input pin may not be displaced from the position of the output pin and performing placement while also taking local coordinates into consideration, therefore, a readily understandable diagram is obtained.

The present embodiment has been described with regard to only the second coordinate. With regard to the first coordinate as well, however, local coordinates can be set and fine adjustment can be made in the same way.

[Wiring Determination]

Finally, processing operation of the above described wiring determining processing section 54 will now be described in detail.

Figure 16:
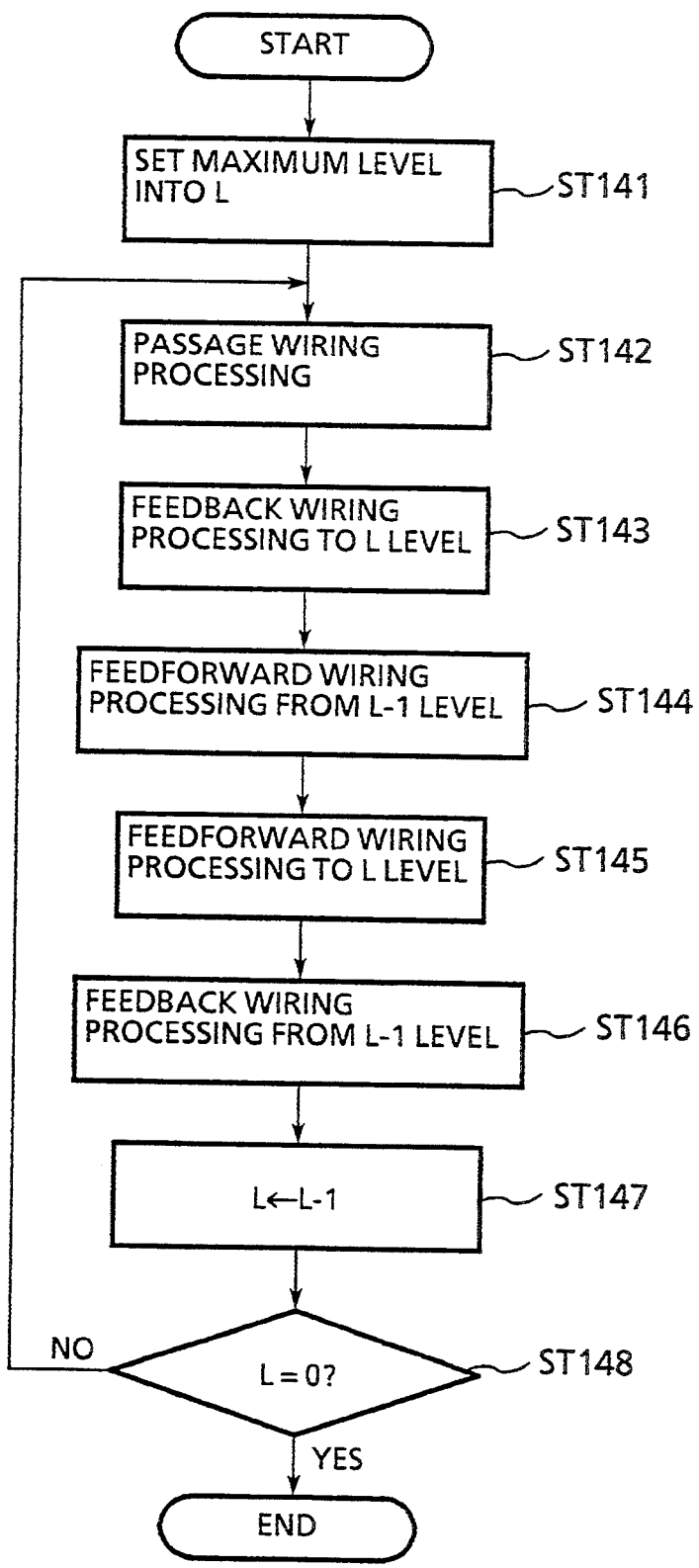
FIG. 16 is a flow chart showing an example of wiring determining processing.

FIG. 16 is a flow chart showing an example of a procedure of processing conducted every kind of wiring in the wiring determining processing section 54.

First of all, the maximum level (the level of the output port) is set into the level counter L at step ST141. At steps ST142 to ST146, wiring of an area of L level, i.e., an area having a global first coordinate equivalent to L is performed. In this wiring, the above described net list, coordinates representing positions of respective placement elements and their pins, and connection information of wiring between an L+1 level and the L level are referred to. Thus coordinates of the start point, bend point and end point of each wiring, and connection information of wiring between the L level and the L-1 level are produced. Further, upon completion of wiring processing of the L level, the count in the level counter L is decreased by 1 at step 147 and it is determined at step ST148 whether the count in the level counter is 0. If the count in the level counter L is not 0, processing returns to the step ST142 and wiring processing of the steps ST142 to ST146 is repeatedly executed for the next level. If the count in the level counter L is 0, wiring determining processing is finished.

In the present embodiment, wiring sequence is determined for each kind of wiring and wiring is determined according to the wiring sequence. In that wiring sequence, the earlier the wiring order is, the closer to the placement element of the L level the wiring is placed. The processing sequence of the steps ST144 and ST145 may be reversed with respect to the present embodiment. For brevity, however, the description will be omitted.

Operation of the above described steps ST142 to ST146 will now be described in detail.

For each wiring, virtual wiring length is first calculated on the basis of the length of vertical constituent at the time of wiring. Wiring is sorted and wiring sequence is then determined according to the virtual wiring length. Further, wiring is conducted from the placement element side of the L level without overlap. For wiring having no bend in the area of the L level, wiring is conducted with priority.

In the present embodiment, the virtual wiring length is made, in principle, equivalent to the length of the vertical constituent at the time of wiring, for brevity. If the upper end of that vertical constituent bends to the L-1 level side, however, the virtual wiring length is calculated assuming that the upper end has a sufficiently large coordinate (such as the coordinate of the top end of the drawing) If, on the contrary the lower end of that vertical constituent bends to the L-1 level side, the virtual wiring length is calculated assuming that the lower end has a sufficiently small coordinate (such as the coordinate of the bottom end of the drawing).

Figure 17:
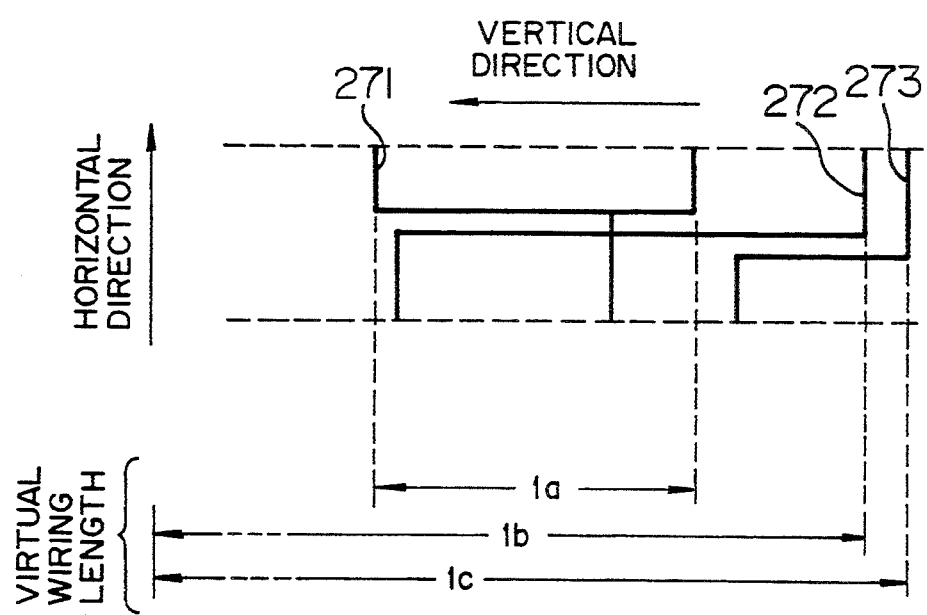
FIG. 17 is a diagram for explaining virtual wiring lengths.

For example, virtual wiring lengths of wiring 271, 272 and 273 respectively become 1a, 1b and 1c as shown in FIG. 17. Further, in the present embodiment, wiring sorting according to virtual wiring length is performed in order of increasing length, i.e., in the ascending order at the steps ST143, ST144 and ST145. At step ST146, the wiring sorting is performed in order of decreasing length, i.e., in the descending order.

In the wiring processing heretofore described, the case where the earlier the wiring order occurs, the closer to the placement element of the L level the wiring is placed has been described. However, the wiring processing can be easily applied to the opposite case as well.

Owing to the pin assignment in the device placement fine adjustment processing section 53 and wiring in the wiring determining processing section 54 of the present embodiment, therefore, a logic circuit diagram with fewer intersections of wiring can be easily generated by simple processing.

Further, by using the automatic logic circuit diagram generation system of the present embodiment, a logic circuit diagram having reduced feedback wiring, increased straight signal lines, reduced bend of signal lines, and reduced intersections of signal lines, and facilitating grasp of logic function can be automatically generated efficiently.

Further, since physical information relating to placement elements is held in the shape information file 2, a change in technology of the subject circuit can be easily coped with, resulting in desired effect.

Since the present invention makes it possible to perform level assignment of nodes with reduced feedback arcs at high speed, such placement as to facilitate tracing of connection relations can be determined.

Further, since intersections of wiring can be reduced}a network chart such as a logic circuit diagram which facilitates understanding connection relations and contents represented by the chart can be automatically generated efficiently, resulting in an excellent effect.

Further, since level assignment of nodes can be performed even if a particular plotting symbol is not present, various network charts can be easily generated, resulting in processing with universality.

We claim:

1. A method of assigning levels to nodes in a network chart comprising the steps of:
    (a) deriving strongly connected components of the network chart;
    (b) weighting arcs flowing into each node of said strongly connected components and arcs flowing out from each node of said strongly connected components;
    (c) detecting arcs having a maximum weight among weights of arcs derived by said step (b) from all arcs included in said strongly connected components; and
    (d) determining a loop disconnection point from said arcs having a maximum weight detected by said step (c).

2. A method of assigning levels to nodes in a network chart according to claims 1, wherein for each node of strongly connected components, weighting is so performed by said step(b) that the sum of weights of arcs having said node as end points may become equal to the sum of weights of arcs having said node as start points.

3. A method of assigning levels to nodes in a network chart according to claims 1, wherein by said step (b), weights of respective arcs are so determined by taking arc weights as variables that for each node of strongly connected components, the sum of weights of arcs having said node as end points may become equal to the sum of weights of arcs having said node as start points and, under the condition that each arc weight has at least a unit value, the sum total of weights may be minimized.

4. A method of assigning levels to nodes in a network chart comprising the steps of:
    (a) deriving strongly connected components from a partial network chart formed by arcs which are not feedback arcs of the network chart;
    (b) weighting arcs flowing into each node of said strongly connected components and arcs flowing out from each node of said strongly connected components;
    (c) detecting a plurality of arcs having a maximum weight and their proportionate weights among arc weights derived by said step (b) from all arcs included in said strongly connected components;
    (d) extracting arcs, included in the maximum weight arcs detected by said step (c), which share start point nodes with previously determined feedback arcs of the network chart;
    (e) determining, upon extracting any arc by said step (d), a feedback arc of the network chart from the extracted arcs; and
    (f) determining, upon failing to extract any arc by said step (d), a feedback arc of the network chart from said arcs having the maximum weight detected by said step (e).

5. A method of assigning levels to nodes in a network chart according to claim 4, wherein for each node of strongly connected components, weighting is so performed by said second step that the sum of weights of arcs having said node as end points may become equal to the sum of weights of arcs having said node as start points.

6. A method of assigning levels to nodes in a network chart according to claim 4, wherein by said step (b), weights of respective arcs are so determined by taking arc weights as variables that for each node of strongly connected components, the sum of weights of arcs having said node as end points may become equal to the sum of weights of arcs having said node as start points and, under the condition that each arc weight has at least a unit value, the sum total of weights may be minimized.

7. A method of assigning levels to nodes in a network chart comprising the steps of:
    (a) assigning levels to respective nodes of the network chart on the basis of parental relations using arcs;
    (b) deriving strongly connected components from the network chart;
    (c) extracting a strongly connected component, having at least two nodes, from said strongly connected components derived by said step (b);
    (d) weighting arcs flowing into each node of said strongly connected components extracted by said step (c) and arcs flowing out from each node of said strongly connected components;
    (e) detecting arcs having a maximum weight among weights of arcs derived by said step (d) from all arcs included in said strongly connected components;
    (f) determining a loop disconnection point from said arcs detected by said step (e);
    (g) repeating said steps (b) to (f) until all nodes of said strongly connected components are assigned levels; and
    (h) forcibly performing node level assignment if (i) every strongly connected component derived by said step (b) has one node and (ii) a node having no level assigned thereto is present in the network chart.

8. A method of assigning levels to nodes in a network chart according to claim 7, wherein for each node of strongly connected components, weighting is so performed by said step (d) that the sum of weights of arcs having said node as end points may become equal to the sum of weights of arcs having said node as start points.

9. A method of assigning levels to nodes in a network chart according to claim 7, wherein by said step (d), weights of respective arcs are so determined by taking arc weights as variables that for each node of strongly connected components, the sum of weights of arcs having said node as end points may become equal to the sum of weights of arcs having said node as start points and, under the condition that each arc weight has at least a unit value, the sum total of weights may be minimized.

10. A method of assigning levels to nodes in a network chart comprising the steps of:
  (a) determining arcs forming self-closed loops of respective nodes of the network chart as feedback arcs;
  (b) deriving strongly connected components from a partial network chart formed by arcs which are not feedback arcs of the network chart;
  (c) extracting a strongly connected component, having at least two nodes, from the strongly connected components derived by said step (b);
  (d) weighting arcs flowing into each node of said strongly connected components extracted by said step (c) and arcs flowing out from each node of said strongly connected components;
  (e) detecting a plurality of arcs having a maximum weight and their proportionate weights among arc weights provided by said step (d) from all arcs included in said strongly connected components;
  (f) extracting arcs included in the arcs detected by said step (e) which share start point nodes with previously determined feedback arcs of the network chart;
  (g) determining, upon extracting any arc by said step (f), a feedback arc of the network chart from the extracted arcs;
  (h) determining, upon failing to extract any arc by said step (f), a feedback arc of the network chart from arcs having the maximum weight detected by said step (e);
  (i) assigning levels to respective nodes on the basis of parental relations using arcs, for a partial network chart obtained by excluding feedback arcs and nodes already having assigned levels from said network chart;
  (j) repeating said steps (b) to (i) until all nodes of said strongly connected components are assigned levels; and
  (k) forcibly performing node level assignment if (i) every strongly connected component derived by said step (b) has one node and (ii) a node having no level assigned thereto is present in the network chart.

11. A method of assigning levels to nodes in a network chart according to claim 10, wherein for each node of strongly connected components, weighting is so performed by said step (d) that the sum of weights of arcs having said node as end points may become equal to the sum of weights of arcs having said node as start points.

12. A method of assigning levels to nodes in a network chart according to claim 10, wherein by said step (d), weights of respective arcs are so determined by taking arc weights as variables that for each node of strongly connected components, the sum of weights of arcs having said node as end points may become equal to the sum of weights of arcs having said node as start points and, under the condition that each arc weight has at least a unit value, the sum total of weights may be minimized.

13. A method of assigning levels to cells in a logic circuit diagram comprising the steps of:
  (a) deriving strongly connected components from a partial circuit including connection lines which are not feedback wiring of the logic circuit diagram;
  (b) weighting connection lines flowing into each cell of said strongly connected components and arcs flowing out from each cell of said strongly connected components;
  (c) detecting a plurality of connection lines having a maximum weight and their proportionate weights among connection line weights derived by said step (b) from all connection lines included in said strongly connected components;
  (d) extracting connection lines, included in the maximum weight connection lines detected by said step (c), which represent the same signal as that of previously determined feedback wiring of the logic circuit;
  (e) determining, upon extracting any connection line by said step (d), feedback wiring of the logic circuit from the extracted connection lines; and
  (f) determining, upon failing to extract any connection lines by said step (d), feedback wiring of the logic circuit from connection lines having the maximum weight detected by the step (c).

14. A method of assigning levels to cells in a logic circuit diagram according to claim 13, wherein for each cell of strongly connected components, weighting is so performed by said step (d) that the sum of weights of connection lines having said cell as end points may become equal to the sum of weights of connection lines having said node as start points.

15. A method of assigning levels to cells in a logic circuit diagram according to claim 13, wherein by said step (d), weights of respective connection lines are so determined by taking connection line weights as variables that for each cell of strongly connected components, the sum of weights of connection lines having said cell as end points may become equal to the sum of weights of connection lines having said cell as start points and, under the condition that each connection line weight has at least a unit value, the sum total of weights may be minimized.

16. A method of assigning levels to cells in a logic circuit diagram comprising the steps of:
  (a) determining connection lines forming self-closed loops of respective cells of the logic circuit as feedback wiring;
  (b) deriving strongly connected components from a partial circuit formed by connection lines which are not feedback wiring of the logic circuit;
  (c) extracting a strongly connected component, having at least two cells, from the strongly connected components derived by said step (b);
  (d) weighting connection lines flowing into each cell of said strongly connected components extracted by said step (c) and connection lines flowing out from each cell of said strongly connected components;
  (e) detecting a plurality of connection lines having a maximum weight and their proportionate weights among weights of connection lines provided by said step (d) from all connection lines included in said strongly connected components;

(f) extracting connection lines included in the connection lines detected by said step (e) which represent the same signal as that of the previously determined feedback wiring of the logic circuit.

(g) determining, upon extracting any connection line by said step (f), feedback wiring of the logic circuit from the extracted connection lines;

(h) determining, upon failing to extract any connection lines by said step (f), feedback wiring of the logic circuit from connection lines having the maximum weight detected by said step (e);

(i) assigning levels to respective cells on the basis of parental relations using connection lines, for a partial circuit obtained by excluding feedback wiring and cells already having assigned levels from said logic circuit;

(j) repeating said steps (b) to (i) until all cells of said strongly connected components are assigned levels; and (k) forcibly performing cell level assignment if (i) every strongly connected component derived by said step (b) has one cell and (ii) a cell having no level assigned thereto is present in the logic circuit diagram.

17. A method of assigning levels to cells in a logic circuit diagram according to claim 16, wherein for each cell of strongly connected components, weighting is so performed by said step (d) that the sum of weights of connection lines having said cell as end points may become equal to the sum of weights of connection lines having said node as start points.

18. A method of assigning levels to cells in a logic circuit diagram according to claim 16, wherein by said step (d) weights of respective connection lines are so determined by taking connection line weights as variables that for each cell of strongly connected components, the sum of weights of connection lines having said cell as end points may become equal to the sum of weights of connection lines having said cell as start points and, under the condition that each connection line weight has at least a unit value, the sum total of weights may be minimized.

19. A system for automatically generating a network chart comprising:
 first information holding means for holding arc-related information of respective nodes in the network chart;
 second information holding means for holding information relating to shapes of symbols placed at respective nodes;
 third information holding means for holding information relating to placement and wiring of the network chart;
 fourth information holding means for holding information relating to patterns of respective placed symbols matched with the information held in said second information holding means;
 drawing means for drawing the network chart in a drawing apparatus on the basis of the information held in said third information holding means and the information held in said fourth information holding means; and
 computing processing means,
 said computing processing means comprising means for executing the steps of:

(a) determining first coordinates of respective nodes on the basis of arc-related information of respective nodes inputted by said first information holding means;

(b) determining second coordinates of all nodes by determining positional relations between nodes functioning as references of placement on the basis of the arc-related information of respective nodes inputted by said first information holding means and said first coordinates of respective nodes and by successively determining positional relations of respective nodes on the basis of arc relations between nodes having positional relations already determined and nodes having positional relations not yet determined;

(c) wiring arcs between nodes after placement of all nodes has been determined on the basis of said first and second coordinates; and (d) producing said information relating to the placement and wiring of the network chart on the basis of said first and second coordinates of respective nodes, results of wiring of respective arcs of said step (c), and information relating to shapes of respective placed symbols held in the second information holding means, and outputting said information to the third information holding means, said step (a) comprising the steps of:

(i) assigning levels to respective nodes of the network chart to determine first coordinates on the basis of parental relations using arcs;

(ii) deriving strongly connected components from the network chart;

(iii) extracting a strongly connected component, having at least two nodes, from the strongly connected components derived by said step (a)(ii);

(iv) weighting arcs flowing into each node of said strongly connected components extracted by said step (a)(iii) and arcs flowing out from each node of said strongly connected components;

(v) detecting arcs having a maximum weight among weights of arcs derived by said step (a)(iv) from all arcs included in said strongly connected components;

(vi) determining a loop disconnection point from said arcs detected at said step (a) (v);

(vii) repeating said steps (a)(ii) to (a)(vi) until all nodes of said strongly connected components are assigned levels; and (viii) forcibly performing node level assignment to perform first coordinate determination if (1) every strongly connected component derived by said step (a)(ii) has one node and (2) a node having no level assigned thereto is present in the network chart.

20. A system for automatically generating a network chart according to claim 19, wherein for each node of strongly connected components, weighting is so performed at said step (a)(iv) that the sum of weights of arcs having said node as end points may become equal to the sum of weights of arcs having said node as start points.

21. A system for automatically generating a network chart according to claim 19, wherein by said step (a)-(iv), weights of respective arcs are so determined by taking arc weights as variables that for each node of strongly connected components, the sum of weights of arcs having said node as end points may become equal to the sum of weights of arcs having said node as start points and, under the condition that each arc weight has at least a unit value, the sum total of weights may be minimized.

22. A system for automatically generating a logic circuit diagram comprising:
   first information holding means for holding connection information of respective cells in the logic circuit diagram;
   second information holding means for holding information relating to shapes of symbols placed at respective cells;
   third information holding means for holding information relating to patterns of respective placed symbols matched with the information held in said second information holding means;
   drawing means for drawing the network chart in a drawing apparatus on the basis of the information held in said third information holding means and the information held in said fourth information holding means; and
   computing processing means,
   said computing processing means comprising means for executing the steps of:
   (a) determining first coordinates of respective cells on the basis of connection information of respective cells inputted by said first information holding means;
   (b) determining second coordinates of all cells by determining positional relations between cells functioning as references of placement on the basis of the connection information of respective cells inputted by said first information holding means and said first coordinates of respective nodes and by successively determining positional relations of respective cells on the basis of connection relations between cells having positional relations already determined and cells having positional relations not yet determined;
   (c) adjusting placement of all cells determined by said first and second coordinates in view of wiring of connection lines between cells;
   (d) wiring connection lines between cells after placement of all cells has been determined by said step (c); and
   (e) producing said information relating to the placement and wiring of said logic circuit on the basis of placement resulting from adjusting respective cells of said step (c), results of wiring of respective connection lines of said step (d), and information relating to shapes of respective placed symbols held in the second information holding means, and outputting said information to the third information holding means,
   said step (a) comprising the steps of:
   (i) determining connection lines forming self-closed loops of respective cells of the logic circuit as feedback wiring;
   (ii) deriving strongly connected components from a partial circuit formed by connection lines which are not feedback wiring of the logic circuit;
   (iii) extracting a strongly connected component, having at least two nodes, from the strongly connected components derived by said step (a)(i);
   (iv) weighting connection lines flowing into each cell of said strongly connected components extracted by said step (a)(iii) and connection lines flowing out from each cell of said strongly connected components;
   (v) detecting a plurality of connection lines having a maximum weight and their proportionate weights among connection line weights derived by said step (a)(iv) from all connection lines included in said strongly connected components;
   (vi) extracting connection lines included in the connection lines detected by said step (a)(v) which represent the same signal as that of previously determined feedback wiring of the logic circuit;
   (vii) determining, upon extracting any connection line by said step (a)(vi), feedback wiring of the logic circuit from the extracted connection lines;
   (vii) determining, upon failing to extract any connection lines by said step (a)(vi), feedback wiring of the logic circuit from connection lines having the maximum weight detected by said step (a)(v);
   (ix) assigning levels to respective cells on the basis of parental relations using connection lines to determine first coordinates for a partial logic circuit obtained by excluding feedback wiring and cells already having assigned levels from said logic circuit;
   (x) repeating said steps (a)(ii) to (a)(ix) until all cells of said strongly connected components are assigned levels; and
   (xi) forcibly performing level assignment to perform first coordinate determination if (1) every strongly connected component derived by said first step had one cell and (2) a cell having no level assigned thereto is present in the logic circuit diagram.

23. A system for automatically generating a logic circuit diagram according to claim 22, wherein for each cell of strongly connected components, weighting is so performed at said step (a)(Iv) that the sum of weights of connection lines having said cell as end points may become equal to the sum of weights of connection lines having said cell as start points.

24. A system for automatically generating a logic circuit diagram according to claim 22, wherein by said step (a)(iv), weights of respective connection lines are so determined by taking connection line weights as variables that for each cell of strongly connected components, the sum of weights of connection lines having said cell as end points may become equal to the sum of weights of connection lines having said cell as start points and, under the condition that each connection line weight has at least a unit value, the sum total of weights may be minimized.

25. A method of automatically generating a network chart comprising:
   (a) determining first coordinates on the basis of arc relations of respective nodes;
   (b) determining second coordinates of all nodes by determining positional relations between nodes functioning as references of placement and successively determining positional relations of respective nodes on the basis of arc relations between nodes having positional relations already determined and nodes having positional relations not yet determined; and
   (c) wiring arcs between nodes after placement of all nodes has been determined, on the basis of said first and second coordinates,
   said step (a) comprising the steps of:
   (i) assigning levels to respective nodes of the network chart to determine said first coordinates on the basis of parental relations using arcs;

(ii) deriving strongly connected components from the network chart;

(iii) extracting a strongly connected component, having at least two nodes, from the strongly connected components derived said step (a)(ii);

(iv) weighting arcs flowing into each node of said strongly connected components extracted by said step (a)(iii) and arcs flowing out from each node of said strongly connected components;

(v) detecting arcs having a maximum weight among weights of arcs provided by said step (a)(iv) included in said strongly connected components;

(vi) determining a loop disconnection point from said arcs detected by said step (a)(v);

(vii) repeating said steps (a)(ii) to (a)(vi) until all nodes of said strongly connected components are assigned levels; and (viii) forcibly performing node level assignment to perform first coordinate determination if (1) every strongly connected component derived by said step (a)(ii) has one node and (2) a node having no level assigned thereto is present in the network chart.

26. A method of automatically generating a network chart according to claim 25, wherein for each node of strongly connected components, weighting is so performed by said step (a)(iv) that the sum of weights of arcs having said node as end points may become equal to the sum of weights of arcs having said node as start points.

27. A method of automatically generating a network chart according to claim 25, wherein by said step (a)(iv), weights of respective arcs are so determined by taking arc weights as variables that for each node of strongly connected components, the sum of weights of arcs-having said node as end points may become equal to the sum of weights of arcs having said node as start points and, under the condition that each arc weight has at least a unit value, the sum total of weights may be minimized.

28. A method of automatically generating a network chart comprising:

(a) determining first coordinates on the basis of arc relations of respective nodes;

(b) determining second coordinates of all nodes by determining positional relations between nodes functioning as references of placement and successively determining positional relations of respective nodes on the basis of arc relations between nodes having positional relations already determined and nodes having positional relations not yet determined;

(c) adjusting placement of all nodes determined by said first and second coordinates in view of wiring of arcs between nodes; and (d) wiring arcs between nodes after placement of all nodes has been determined by said step (c), said step (a) comprising the steps of:

(i) determining arcs forming self-closed loops of respective nodes of the network chart as feedback arcs;

(ii) deriving strongly connected components from a partial network chart formed by arcs which are not feedback arcs of the network chart;

(iii) extracting a strongly connected component, having at least two nodes, from the strongly connected components derived by said step (a)(ii);

(iv) weighting arcs flowing into each node of said strongly connected components extracted by said step (a)(iii) and arcs flowing out from each node of said strongly connected components;

(v) detecting a plurality of arcs having a maximum weight and their proportionate weights among arc weights provided by said step (a)(iv) from all arcs included in said strongly connected components;

(vi) extracting arcs included in the arcs detected by said (a)(v) which share start point nodes with previously determined feedback arcs of the network chart;

(vii) determining, upon extracting any arc by said step (a)(vi), a feedback arc of the network chart from the extracted arcs;

(viii) determining, upon failing to extract any arc by said step (a)(vi) a feedback arc of the network chart from arcs having the maximum weight detected by said step (a)(v);

(ix) assigning levels to respective nodes on the basis of parental relations using arcs to determine first coordinates for a partial network chart obtained by excluding feedback arcs and nodes already having assigned levels from said network chart;

(x) repeating said steps (a)(ii) to (a)(ix) until all nodes of said strongly connected components are assigned levels; and (xi) forcibly performing node level assignment to perform first coordinate determination if (1) every strongly connected component derived by said step (a)(ii) has one node and (2) a node having no level assigned thereto is present in the network chart.

29. A method of automatically generating a network chart according to claim 28, wherein for each node of strongly connected components, ,weighting is so performed by said step (a)(iv) that the sum of weights of arcs having said node as end points may become equal to the sum of weights of arcs having said node as start points.

30. A method of automatically generating a network chart according to claim 28, wherein by said step (a)(iv), weights of respective arcs are so determined by taking arc weights as variables that for each node of strongly connected components, the sum of weights of arcs having said node as end points may become equal to the sum of weights of arcs having said node as start points and, under the condition that each arc weight has at least a unit value, the sum total of weights may be minimized.

31. A method of automatically generating a logic circuit diagram comprising:

(a) determining first coordinates on the basis of connection relations of respective cells;

(b) determining second coordinates of all cells by determining positional relations between cells functioning as references of placement and successively determining positional relations of respective cells on the basis of connection relations between cells having positional relations already determined and cells having positional relations not yet determined;

(c) adjusting placement of all cells determined by said first and second coordinates in view of wiring of connection lines between cells; and (d) wiring connection lines between cells after placement of all cells has been determined by said step (c), said step (a) comprising the steps of:

(i) determining connection lines forming self-closed loops of respective cells of the logic circuit as feedback wiring;

(ii) deriving strongly connected components from a partial circuit formed by connection lines which are not feedback wiring of the logic circuit;

(iii) extracting a strongly connected component, having at least two cells, from the strongly connected components derived by said step (a)(ii);

(iv) weighting connection lines flowing into each cell of said strongly connected components extracted by said step (a)(iii) and connection lines flowing out from each cell of said strongly connected components;

(v) detecting a plurality of connection lines having a maximum weight and their proportionate weights among connection line weights derived by said step (a)(iv) from all connection lines included in said strongly connected components;

(vi) extracting connection lines included in the connection lines detected by said step (a)(v) which represent the same signal as that of previously determined feedback wiring of the logic circuit;

(vi) determining, upon extracting any connection line by said step (a)(vi), feedback wiring of the logic circuit from the extracted connection lines;

(viii) determining, upon failing to extract any connection lines by said step (a)(vi), feedback wiring of the logic circuit from connection lines having the maximum weight detected by said step (a)(v);

(ix) assigning levels to respective cells on the basis of parental relations using connection lines to determine first coordinates for a partial circuit obtained by excluding feedback wiring and cells already having assigned levels form said logic circuit;

repeating said steps (a)(ii) to (a)(ix) until all cells of said strongly connected components are assigned levels; and (xi) forcibly performing cell level assignment to perform first coordinate determination if (1) every strongly connected component derived by said step (a)(ii) has one cell and (2) a cell having no level assigned thereto is present in the logic circuit diagram.

32. A method of automatically generating a logic circuit diagram according to claim 31, wherein for each cell of strongly connected components, weighting is so performed by said step (a)(iv) that the sum of weights of connection lines having that cell as end points may become equal to the sum of weights of connection lines having that cell as start points.

33. A method of automatically generating a logic circuit diagram according to claim 31, wherein by said step (a)(iv), weights of respective connection lines are so determined by taking connection line weights as variables that for each cell of strongly connected components, the sum of weights of connection lines having that cell as end points may become equal to the sum of weights of connection lines having that cell as start points and, under the condition that each connection line weight has at least a unit value, the sum total of weights may be minimized.

34. A system for automatically generating a network chart comprising:

first information holding means for holding arc-related information of respective nodes in the network chart;

second information holding means for holding information relating to shapes of symbols placed at respective nodes;

third information holding means for holding information relating to placement and wiring of the network chart;

fourth information holding means for holding information relating to patterns of respective placed symbols matched with the information held in said second information holding means;

drawing means for drawing the network chart in a drawing apparatus on the basis of the information held in said third information holding means and the information held in said fourth information holding means; and computing processing means, said computing processing means comprising means for executing the steps of:

(a) determining first coordinates of respective nodes on the basis of arc-related information of respective nodes inputted by said first information holding means;

(b) determining second coordinates of all nodes by determining positional relations between nodes functioning as references of placement on the basis of the arc-related information of respective nodes inputted by said first information holding means and said first coordinates of respective nodes and by successively determining positional relations of respective nodes on the basis of arc relations between nodes having positional relations already determined and nodes having positional relations not yet determined;

(c) adjusting placement of all nodes determined by said first and second coordinates in view of wiring of arcs between nodes;

(d) wiring arcs between nodes after placement of all nodes has been determined by said step (c); and (e) producing said information relating to the placement and wiring of the network chart on the basis of placement resulting from adjusting respective nodes (by) said step (c), results of wiring of respective arcs by said step (d), and information relating to shapes of respective placed symbols held in the second information holding means, and outputting said information to the third information holding means, said step (a) comprising the steps of:

(i) determining arcs forming self-closed loops of respective nodes of the network chart as feedback arcs;

(ii) deriving strongly connected components from a partial network chart formed by arcs which are not feedback arcs of the network chart;

(iii) extracting a strongly connected component, having at least two nodes, from the strongly connected components derived by said step (a) (ii);

(iv) weighting arcs flowing into each node of said strongly connected components extracted by said step (a)(iii) and arcs flowing out from each node of said strongly connected components;

(v) detecting a plurality of arcs having a maximum weight and their proportionate weights among arc weights derived by said step (a)(iv) from all arcs included in said strongly connected components;

(vi) extracting arcs included in the arcs detected by said step (a)(v) which share start point nodes with previously determined feedback arcs of the network chart;

(vii) determining, upon extracting any arc by said step (a)(vi), a feedback arc of the network chart from the extracted arcs;

(viii) determining, upon failing to extract any arc by said step (a)(vi), a feedback arc of the network chart from arcs having the maximum weight detected by said step (a)(v);

(ix) assigning levels to respective nodes on the basis of parental relations using arcs to determine first coordinates for a partial network chart obtained by excluding feedback arcs and nodes already having assigned levels from said network chart;

(x) repeating said steps (a)(ii) to (a)(ix) until all nodes of said strongly connected components are assigned level; and (xi) forcibly performing node level assignment to perform first coordinate determination if (1) every strongly connected component derived by said step (a)(ii) has one node and (2) a node having no level assigned thereto is present in the network chart.

35. A system for automatically generating a network chart according to claim 34, wherein for each node of strongly connected components, weighting is so performed by said step (a)(iv) the sum of weights of arcs having said node as end points may become equal to the sum of weights of arcs having said node as start points.

36. A system for automatically generating a network chart according to claim 34, wherein by said step (a)(iv) weights of respective arcs are so determined by taking arc weights as variables that for each node of strongly connected components, the sum of weights of arcs having said node as end points may become equal to the sum of weights of arcs having said node as start points and, under the condition that each arc weight has at least a unit value, the sum total of weights may be minimized.

* * * * *